(12) United States Patent
Yamakita et al.

(10) Patent No.: US 6,839,626 B2
(45) Date of Patent: Jan. 4, 2005

(54) NAVIGATION METHOD/APPARATUS CAPABLE OF REGISTERING DETAILED NAVIGATION COURSE INFORMATION, AND NAVIGATION PROGRAM

(75) Inventors: Tooru Yamakita, Fussa (JP); Toshihiko Miyamura, Sagamihara (JP)

(73) Assignee: Casio Computer Co., Ltd., Tokyo (JP)

( * ) Notice: Subject to any disclaimer, the term of this patent is extended or adjusted under 35 U.S.C. 154(b) by 9 days.

(21) Appl. No.: 10/465,142

(22) Filed: Jun. 19, 2003

(65) Prior Publication Data

US 2003/0236614 A1 Dec. 25, 2003

(30) Foreign Application Priority Data

Jun. 24, 2002 (JP) ........................................ 2002-182805

(51) Int. Cl.[7] ........................ G01C 21/26; G01C 21/28
(52) U.S. Cl. ...................... 701/207; 701/214; 701/216; 701/35; 342/357.01; 342/357.13
(58) Field of Search ................................ 701/200, 207, 701/214, 216, 213, 300, 35; 342/357.01, 357.08, 357.13

(56) References Cited

U.S. PATENT DOCUMENTS 6,132,391 A * 10/2000 Onari et al. ................ 600/595
6,546,336 B1 * 4/2003 Matsuoka et al. .......... 701/213
6,571,193 B1 * 5/2003 Unuma et al. .............. 702/141

FOREIGN PATENT DOCUMENTS

JP 2002-286481 A 10/2002

* cited by examiner

Primary Examiner—Gertrude A. Jeanglaude
(74) Attorney, Agent, or Firm—Frishauf, Holtz, Goodman & Chick, P.C.

(57) ABSTRACT

In a navigation apparatus, when a user starts to walk along a walking course, the user instructs the navigation apparatus to commence the navigation operation as to this walk course which has been formed/registered thereinto based upon positional information, walking pattern information, and temporal information. The navigation apparatus sequentially compares a present walking speed with another walking speed which was acquired at the same position in the past by executing a walking-speed comparing process operation, and then notifies such an information related to a present walking pace of this user based upon the comparison result with respect to the user.

15 Claims, 22 Drawing Sheets

| ACTION PATTERN NAME | X | | | Y | | | Z | | |
|---|---|---|---|---|---|---|---|---|---|
| | PEAK ACCELERATION (G) | PEAK INTERVAL (s) | | PEAK ACCELERATION (G) | PEAK INTERVAL (s) | | PEAK ACCELERATION (G) | PEAK INTERVAL (s) | |
| FLAT-LAND WALKING | ±0.5 | 0.5 | | ±0.5 | 0.5 | | 1±0.5 | 0.5 | |
| GENTLE-DOWNHILL-SLOPE WALKING | ±0.7 | 0.4 | | ±0.7 | 0.4 | | 1.2±0.7 | 0.4 | |
| GENTLE-UPHILL-SLOPE WALKING | ±0.4 | 0.7 | | ±0.4 | 0.7 | | 0.8±0.4 | 0.7 | |
| WHILE USER TAKES TRAIN | | | | | | | | | |
| WHILE USER DRIVES CAR | | | | | | | | | |
| USER TAKES ELEVATOR TO UPSTAIRS | | | | | | | | | |
| USER TAKES ELEVATOR TO DOWNSTAIRS | | | | | | | | | |
| JOGGING | | | | | | | | | |
| RUNNING | | | | | | | | | |

FIG. 4

| WALKING PATTERN NAME | X | | Y | | Z | | WALKING SPEED (km/h) | WALKING ENVIRONMENT |
|---|---|---|---|---|---|---|---|---|
| | PEAK ACCELERATION (G) | PEAK INTERVAL (s) | PEAK ACCELERATION (G) | PEAK INTERVAL (s) | PEAK ACCELERATION (G) | PEAK INTERVAL (s) | | |
| A | ±0.5 | 0.5 | ±0.5 | 0.5 | 1±0.5 | 0.5 | 4 | FLAT-LAND |
| B | ±0.7 | 0.4 | ±0.7 | 0.4 | 1.2±0.7 | 0.4 | 4.5 | GENTLE DOWNHILL |
| C | ±0.4 | 0.7 | ±0.4 | 0.7 | 0.8±0.4 | 0.7 | 3 | GENTLE UPHILL |
| D | | | | | | | 5 | DOWNHILL |
| E | | | | | | | 2 | UPHILL |
| F | | | | | | | $D_2$ | FLAT-LAND |

| WALKING COURSE NAME | WALKING COURSE MEASUREMENT DATA | COURSE OUTLINE |
|---|---|---|
| WALKING | Data W | WALK TAME LAKE 1 TIME AROUND SEIBU-YUEN STATION |
| A | Data A | ×××××× |
| B | Data B | ○○○○ |
| C | Data C | △△△△△ |
|  |  |  |
|  |  |  |
| Z | Data Z | ☐☐☐☐☐☐☐☐ |

| MEASURING POINT | LATITUDE | LONGITUDE | WALKING PATTERN | DATA/TIME | |
|---|---|---|---|---|---|
| 1 | 43.03 | 141.21 | A | 2002.03.19 | 10:11:00 |
| 2 | 40.49 | 140.44 | A | 2002.03.19 | 10:14:00 |
| 3 | 39.42 | 141.09 | A | 2002.03.19 | 10:17:00 |
| 4 | 38.16 | 140.52 | A | 2002.03.19 | 10:20:00 |
| 5 | 39.43 | 140.06 | A | 2002.03.19 | 10:23:00 |
| 6 | 38.15 | 140.2 | A | 2002.03.19 | 10:26:00 |
| 7 | 37.45 | 140.28 | A | 2002.03.19 | 10:29:00 |
| 8 | 36.22 | 140.28 | A | 2002.03.19 | 10:32:00 |
| 9 | 36.33 | 139.53 | B | 2002.03.19 | 10:35:00 |
| 10 | 36.23 | 139.03 | B | 2002.03.19 | 10:38:00 |
| 11 | 35.51 | 139.38 | B | 2002.03.19 | 10:41:00 |
| 12 | 35.36 | 140.06 | B | 2002.03.19 | 10:44:00 |
| 13 | 35.41 | 139.45 | B | 2002.03.19 | 10:47:00 |
| 14 | 35.26 | 139.38 | B | 2002.03.19 | 10:50:00 |
| 15 | 37.55 | 139.02 | B | 2002.03.19 | 10:53:00 |
| 16 | 36.41 | 137.13 | B | 2002.03.19 | 10:57:00 |
| 17 | 36.33 | 136.39 | B | 2002.03.19 | 11:00:00 |
| 18 | 36.03 | 136.13 | B | 2002.03.19 | 11:03:00 |
| 19 | 35.39 | 138.34 | B | 2002.03.19 | 11:06:00 |
| 20 | 36.39 | 138.11 | A | 2002.03.19 | 11:09:00 |
| 21 | 35.25 | 136.45 | A | 2002.03.19 | 11:12:00 |
| 22 | 34.58 | 138.23 | B | 2002.03.19 | 11:15:00 |
| 23 | 35.11 | 136.54 | B | 2002.03.19 | 11:32:00 |
| 24 | 34.43 | 136.3 | B | 2002.03.19 | 11:35:00 |
| 25 | 35 | 135.52 | C | 2002.03.19 | 11:38:00 |
| 26 | 35 | 135.46 | C | 2002.03.19 | 11:41:00 |
| 27 | 34.41 | 135.29 | C | 2002.03.19 | 11:44:00 |
| 28 | 34.41 | 135.11 | C | 2002.03.19 | 11:47:00 |
| 29 | 34.41 | 135.48 | C | 2002.03.19 | 11:50:00 |
| 30 | 34.14 | 135.1 | C | 2002.03.19 | 11:53:00 |
| 31 | 35.29 | 135.13 | C | 2002.03.19 | 11:57:00 |
| 32 | 35.27 | 133.04 | C | 2002.03.19 | 11:57:00 |
| 33 | 34.39 | 133.54 | C | 2002.03.19 | 12:00:00 |
| 34 | 34.23 | 132.27 | C | 2002.03.19 | 12:03:00 |
| 35 | 34.11 | 131.27 | C | 2002.03.19 | 12:06:00 |
| 36 | 34.03 | 134.32 | C | 2002.03.19 | 12:09:00 |
| 37 | 34.2 | 134.02 | C | 2002.03.19 | 12:12:00 |
| 38 | 33.5 | 132.44 | C | 2002.03.19 | 12:15:00 |
| 39 | 33.33 | 133.31 | C | 2002.03.19 | 12:32:00 |
| 40 | 33.35 | 130.23 | C | 2002.03.19 | 12:35:00 |
| 41 | 33.16 | 130.16 | C | 2002.03.19 | 12:38:00 |
| 42 | 32.45 | 129.52 | C | 2002.03.19 | 12:41:00 |
| 43 | 32.48 | 130.42 | C | 2002.03.19 | 12:44:00 |
| 44 | 33.14 | 131.37 | C | 2002.03.19 | 12:47:00 |
| 45 | 31.56 | 131.25 | C | 2002.03.19 | 12:50:00 |
| 46 | 31.36 | 130.33 | C | 2002.03.19 | 12:53:00 |
| 47 | 26.13 | 127.41 | C | 2002.03.19 | 12:57:00 |
| | | | REQUIRED TIME | 2h46min | |

FIG. 19A

165 — USER IS WALKING AT SAME PACE AS PRECEDING PACE

FIG. 19B

166 — PRESENT WALKING PACE IS SLIGHTLY FASTER THAN PRECEDING WALKING PACE

FIG. 19C

167 — PRESENT WALKING PACE IS SLIGHTLY SLOWER THAN PRECEDING WALKING PACE

NAVIGATION METHOD/APPARATUS CAPABLE OF REGISTERING DETAILED NAVIGATION COURSE INFORMATION, AND NAVIGATION PROGRAM

BACKGROUND OF THE INVENTION

1. Field of the Invention

The present invention is generally related to navigation method/apparatus capable of registering detailed positional/walking information within navigation courses, and also a navigation program. More specifically, the present invention is directed to such navigation method/apparatus capable of registering walking information of courses along which users walk, and also capable of notifying messages of walking paces and such a message that users walk along correct courses with respect to these users who are walking along these courses based upon the registered walking information of these courses. Further, the present invention is directed to a computer-readable navigation program capable of executing the navigation method.

2. Description of the Prior Art

As typically known as car navigation systems, very recently, large numbers of services/products using GPS (Global Positioning System) functions have been marketed. In particular, PDA (Personal Digital Assistant) navigation systems in which walking navigation services are available in portable information terminals (PDAs) have also been currently popularized other than on-vehicle type navigation systems such as car navigation systems. This sort of PDA navigation system can be realized by arranging a PDA main body, a GPS receiver, and map software. In other words, since the GPS receiver is connected to the PDA main body and the map software is initiated, present positions of a user may be displayed on the map. Among the above-described walking navigation systems, such conventional walking navigation systems are utilized which have a function capable of recording a course through which users have once passed, and also own another function capable of calculating required walking time of a designated course when this course is designated.

However, these conventional walking navigation systems merely record the courses through which the users have once passed, but cannot utilize these recorded move conditions in comparison with present walking conditions. Also, since the required walking times of the respective courses are calculated based upon averaged walking speeds, these required walking times could not reflect correct walking times.

SUMMARY OF THE INVENTION

The present invention has been made to solve the above-described drawbacks of the conventional navigation systems, and therefore, has an object to provide such navigation method/apparatus capable of registering detailed positional information/walking information as to various walking courses, and also, capable of producing course data in which correct required walking times of courses are registered. Furthermore, the present invention has another object to provide navigation method/apparatus capable of providing useful information with users. That is, while users are walking in such courses along which these users have walked in the past, the navigation method/apparatus of the present invention can provide with these users, such useful information as to whether or not the users walk along the correct courses, and can provide walking paces by utilizing the course data which have been registered in the past.

To achieve the above-described objects, a navigation apparatus, according to an aspect of the present invention, is featured by such a navigation apparatus comprising:

positional information acquiring means for acquiring positional information of a portable terminal apparatus owned by a user;

acceleration detecting means for detecting acceleration produced in connection with movement of the portable terminal apparatus;

walking pattern acquiring means for acquiring a walking pattern of the user from the acceleration data detected by the acceleration detecting means;

temporal information acquiring means for acquiring temporal information;

course data storage means for storing thereinto as course data, the positional information of the portable terminal apparatus owned by the user, the walking pattern of the user, and a present time instant, which are acquired by the positional information acquiring means, the walking pattern acquiring means, and the temporal information acquiring means respectively;

walking pace monitoring means for reading the course data from the course data storage means when the user walks along such a course whose data has been stored in the course data storage means, and for monitoring both a present walking pace of the user and another walking pace thereof when the user walked along the course in the past based upon the temporal information which is contained in the read course data; and notification means for notifying a proper message related to the present walking pace to the user in response to the monitoring result of the walking pace monitoring means.

Also, a navigation method, according to another aspect of the present invention, is featured by such a navigation method comprising the steps of:

acquiring positional information of a portable terminal apparatus owned by a user;

detecting acceleration produced in connection with movement of the portable terminal apparatus;

forming course data about a course along which the user walks based upon both the positional information detected in the positional information detecting step and the acceleration detected in the acceleration detecting step;

storing the course data formed in said course data forming step;

forming past-walking-position-trail data when the user walked along said course in the past based upon the course data stored in said course data storing step;

forming present-walking-position-trail data when the user walks along said course at the present time based upon said course data formed in said course data forming step;

identifying said present-walking-position-trail data formed in said present-walking-position-trail-data forming step with respect to said past-walking-position-trail data formed in said past-walking-position-trail-data forming step in order to monitor as to whether or not said user deviates from the past walking trail; and notifying such a message that the user deviates from the course with respect to the user in the case that the walking trail monitoring step judges that the user deviates from the past walking trail, and then providing a route for returning back to the course with respect to the user.

Further, a navigation program, according to another aspect of the present invention, is featured by such a navigation program executable by a computer installed in a navigation apparatus wherein:

the navigation program causes the computer to execute:

a comparing function for comparing a target time required for such a case that a user of the navigation apparatus again walks along the same course as the course along which the user walked in the past with a time required for the walking course along which the user walked in the past; and an adjusting function for adjusting a walking speed of the user in the course in such a manner that the required target time of the user is made coincident with the past required time of the user in such a case that the comparing function judges that there is a difference between the required target time of the user and the past required time of the user.

BRIEF DESCRIPTION OF THE SEVERAL VIEWS OF THE DRAWINGS

For a better understanding of the present invention, reference is made of a detailed description in conjunction with the accompanying drawings:

FIG. 2 is a diagram for illustratively showing a data construction of an action pattern register DB (database) 51a employed in the navigation apparatus of FIG. 1;

FIG. 4 is a diagram for illustratively showing a data structure of a walking pattern DB 51b employed in the navigation apparatus of FIG. 1;

FIG. 5 is a diagram for illustratively indicating a data structure of a walking course DB 51c provided in the navigation apparatus of FIG. 1;

FIG. 6 is a diagram for illustratively showing a data structure as to walking course measurement data;

FIG. 19A is a diagram for illustratively showing an example of a message related to a walking pace, which is notified to the user;

FIG. 19B is a diagram for illustratively indicating another example of a message related to a walking pace, which is notified to the user;

FIG. 19C is a diagram for illustratively showing another example of a message related to a walking pace, which is notified to the user;

DETAILED DESCRIPTION OF PREFERRED EMBODIMENTS OF THE INVENTION

Referring now to drawings, various embodiments of the present invention will be described in detail.

[Hardware Construction of First Navigation Apparatus]

Figure 1:
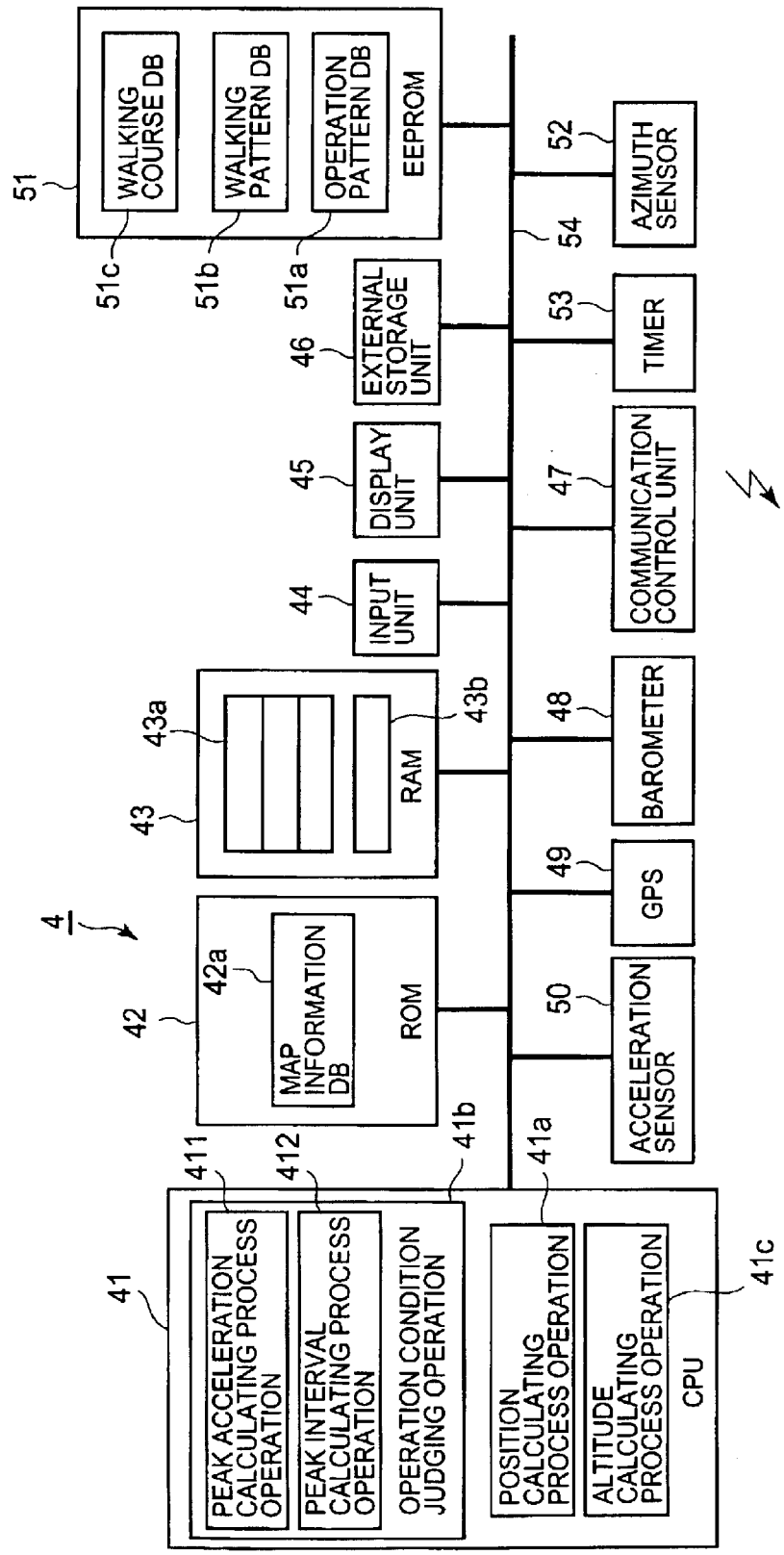
FIG. 1 is a schematic block diagram for representing a hardware structure of a navigation apparatus according to a first embodiment of the present invention.

FIG. 1 is a schematic block diagram for indicating a hardware construction of a navigation apparatus 4 according to a first embodiment of the present invention.

As indicated in this drawing, the navigation apparatus 4 is arranged by employing a CPU (Central Processing Unit) 41, a ROM (Read-Only Memory) 42, a RAM (Random Access Memory) 43, an input unit 44, a display unit 45, an external storage unit 46, a communication control unit 47, a barometer 48, a GPS (Global Positioning System) 49, an acceleration sensor 50, an EEPROM (Electrically Erasable and Programmable Read-Only Memory) 51, an azimuth sensor 52, and a timer 53. The CPU 41 is connected via a bus 54 to other devices 42 to 53.

While the CPU 41 executes computer programs which have been stored/loaded in/on the ROM 42 and the RAM 43 respectively, this CPU 41 may execute a position calculating process operation 41a, an action condition judging process operation (namely, action condition judging function) 41b, and an altitude calculating process operation (namely, altitude calculating function) 41c, as shown in FIG. 1. The position calculating process operation 41a calculates a present position (both longitude and latitude) of a user who carries the navigation apparatus 4. The action condition judging process operation 41b includes a peak acceleration calculating process operation (namely, peak acceleration calculating function) 411, and also, a peak interval calculating process operation (namely, peak interval calculating function) 412. In the action condition judging process operation 41b, an action pattern (namely, sort of action) of the user who carries this navigation apparatus 4 is judged based upon both peak acceleration and a peak interval of a move vector (walking vector) of the user. In this action condition judging process operation 41b, both a move direction and a walking speed of the user who carries the navigation apparatus 4 are extracted based upon results calculated by the peak acceleration calculating process operation 411 and the peak interval calculating process operation 412, respectively. The altitude calculating process operation 41c calculates altitude of a place where the user who carries the navigation apparatus 4 is located based upon atmospheric data measured by the barometer 48 and the like.

The ROM 42 constitutes a map information database (map information DB) 42a, and stores thereinto a compute program by which the CPU 41 may execute the above-described various process operations 41a, 41b, and 41c. The map information DB 42a is constituted by that positional information of respective points on a map has been registered by way of "latitude, longitude, and altitude", and also, topographical information may be acquired. As a result, for instance, it is possible to investigate as to whether a walking course corresponds to a downhill slope, a level-land (flat-land), or an uphill slope based upon this map information database 42a. This map information DB 42a covers, for example, map information as to respective countries, e.g., Japan, and is constituted by a plurality of maps (partial maps) in the unit of, for example, a prefecture, or a smaller regional area than this prefecture. This partial map may be retrieved/extracted from the map information DB 42a in accordance with either a name or an identifier of this partial map.

The RAM 43 contains a register group 43a, a table 43b, a work area, and the like. The register group 43a is employed so as to temporarily store data into this register group 43a when the CPU 41 executes the programs capable of performing the various sorts of process operations such as the above-explained calculating/judging functions 41a, 41b, 41c. The table 43b temporarily stores thereinto walking course measurement data (will be explained later). The work area is employed so as to graphically represent a walking course by expressing latitude in an ordinate, and by expressing longitude in an abscissa.

The input unit 44 is provided with various sorts of keys, a pointing device such as a mouse, and a pen input device using a touch panel. These keys contain a power switch, operation setting switches, data setting switches, and the like. The display unit 45 is constructed of a liquid crystal display, or the like. This display unit 45 displays various sorts of information required by the user by using the input unit 44, and also, displays various sorts of registering screens (for example, registering screen of walking course, registering screen of action pattern). The user-entered information includes, for instance, a designation of starting/ending of a course measuring operation, a designation of starting/ending of a navigation operation, a map indication of an area where the user is walking. The external storage unit 45 corresponds to, for example, a compact storage medium such as a memory card, and stores thereinto map information DB other than the map information DB 42a downloaded via the communication control unit 47, and also stores software.

The communication control unit 47 performs wireless communications with respect to other portable electronic appliances such as portable information terminals (PDAs), and information processing apparatus such as personal computers by way of, for example, Bluetooth and the like. This communication control unit 47 also performs data communications with respect to servers and information processing apparatus, which are connected to various sorts of networks, based upon communications using a modem, an NIC (Network Interface Card), and furthermore, a portable telephone, and a PHS (Personal Handyphone System). The barometer 48 measures atmospheric pressure of an existence position of the navigation apparatus 4. The GPS 49 is equipped with a GPS receiving function, and calculates both longitude and latitude of a present position of the navigation apparatus 4 by utilizing the global positioning system. The acceleration sensor 50 detects acceleration components of the respective X, Y, Z-axial directions of a three-dimensional space coordinate system at a present time instant of the navigation apparatus 4.

The EEPROM 51 stores thereinto an action pattern register database (namely, action pattern register DB) 51a, a walking pattern database (namely, walking pattern DB) 51b, and a walking course database (namely, walking course DB) 51c.

The action pattern register DB 51a corresponds to such a database that various sorts of action patterns of persons (users) have been classified based on acceleration information, and the classified action patterns have been stored thereinto. The acceleration information is represented by three-dimensional vectors having three components of the X-axis, the Y-axis, and the Z-axis. This action pattern register DB 51a is utilized so as to specify actions of the user who carries the navigation apparatus 4. In other words, in this first embodiment, when the user performs a certain action, the action condition judging process operation 41b detects acceleration information (both peak acceleration and peak interval) of the respective X, Y, Z-axis as to acceleration detected by the acceleration sensor 50, and then, retrieves the storage content of the action pattern register DB 42b while using the detected acceleration information as a key in order to specify this action.

The walking pattern DB 51b corresponds to such a database that walking patterns of the user under various walking environments (flat-land, uphill slope, downhill slope etc.) have been classified/stored based upon the above-explained acceleration information of the acceleration vector and the walking speeds.

The walking course DB 51c corresponds to a database which has stored such information related to courses (walking courses) along which the user has walked in the past, and also, courses designated by the user (namely, courses along which user has not yet walked). For instance, as to a plurality of measuring points set to a walking course, this walking course DB 51c has registered respective items of "positional information (latitude and longitude)", "walking pattern", and "date/time (passed date/time of measuring point)" every measuring point. It should be noted that the "date/time" item as to the courses designated by the user is not registered in this walking course DB 51c.

The azimuth sensor 52 corresponds to such a sensor capable of detecting azimuth with respect to each of the X-axis component, the Y-axis component, and the Z-axis component. This azimuth sensor 52 detects moving azimuth of the user who carries the navigation apparatus 4. Based on both azimuth data detected by this azimuth sensor 52 and acceleration data detected by the above-described acceleration sensor 50, a trail of an action of the user who carries the navigation apparatus 4 can be grasped. When the user is located at such a place where the GPS 49 cannot receive GPS electromagnetic waves, the present position of this user may be traced by using the azimuth sensor 52.

The timer 53 counts present time instants, and also, issues an interruption to the CPU 41 in a periodic manner in order that a predetermined process operation may be initiated by this CPU 41 in a constant time period.

[Data Construction of Action Pattern Register DB 51a]

FIG. 2 is a diagram for illustratively showing a data construction of the action pattern register DB 51a shown in FIG. 1.

As shown in this drawing, the action pattern register DB 51a corresponds to such a database into which various pattern information has been registered. The pattern information corresponds to a plurality of walking patterns (flat-land walking, gentle downhill walking, gentle uphill walking), and also, a plurality of action patterns as to plural modes of persons, for example, "while user takes train", "while user takes car", - - -, "user runs." The information related to the respective action patterns has been registered as records which are constituted by respective fields of "X-axis acceleration information", "Y-axis acceleration information", and "Z-axis acceleration information." The acceleration information field of each of these X-axis, Y-axis, and Z-axis is constituted by sub-fields of "peak acceleration (G)" and "peak interval (s)."

Figure 3A:
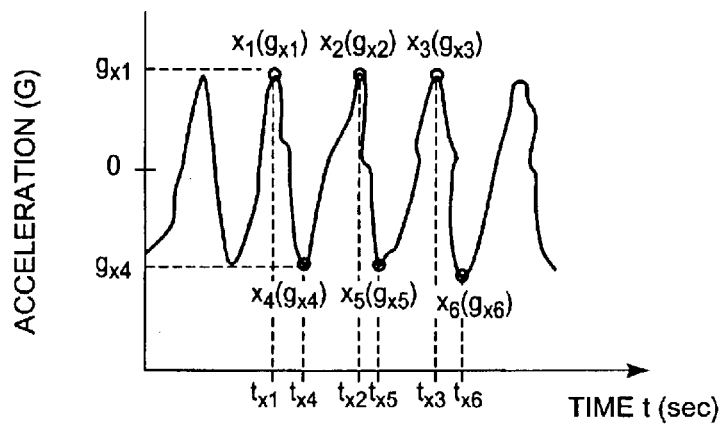
FIG. 3A is a diagram for graphically explaining a method of calculating a temporal variation, a peak interval, and peak acceleration of an X-axis component of an acceleration vector during walking.
Figure 3B:
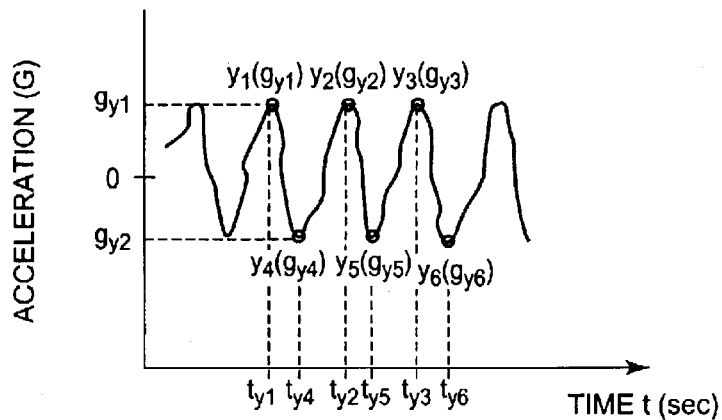
FIG. 3B is a diagram for graphically explaining a method of calculating a temporal variation, a peak interval, and peak acceleration of a Y-axis component of an acceleration vector during walking.
Figure 3C:
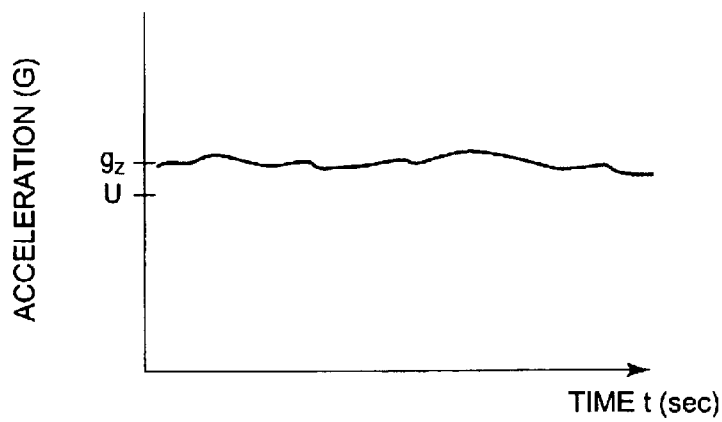
FIG. 3C is a diagram for graphically explaining a method of calculating a temporal variation, a peak interval, and peak acceleration of a Z-axis component of an acceleration vector during walking.

Referring now to FIG. 3A to FIG. 3C, the above-described peak acceleration and peak interval will be explained.

In the graphic representations of FIG. 3A to FIG. 3C, an ordinate shows acceleration (G), and an abscissa denotes time (sec). FIG. 3A corresponds to the X-axis, FIG. 3B corresponds to the Y-axis, and FIG. 3C corresponds to the Z-axis.

In the examples indicated in FIG. 3A to FIG. 3C, while the acceleration of the X-axis and the acceleration of the Y-axis are vibrated with being crossing zero, the acceleration of the Z-axis becomes substantially stationary and the value of this stationary acceleration becomes "gz." In this case, both peak acceleration and a peak interval are present in the X-axis and the Y-axis respectively. However, in the case of the Z-axis, neither peak acceleration nor a peak interval is present (namely, acceleration along Z-axis direction is constant). In this case, the exemplification of the X-axis will now be described as follows: That is, as peak points, acceleration of "gx1", "gx4", "gx2", "gx5", "gx3", and "gx6" at time instants of "tx1", "tx4", "tx2", "tx5", "tx3", and "tx6" is sampled in a time sequential manner. Then, 5 sets of sampling intervals of (tx4–tx1), (tx2–tx4), (tx5–tx2), (tx3–tx5), and (tx6–tx3) are calculated which are adjacent to each other, and an average value "x0" of these five sampling intervals is assumed as a peak interval. Also, with respect to the peak acceleration, a calculation is made of abs (gx1–gx4), abs(gx4–gx2), abs(gx2–gx5), abs(gx5–gx3), and abs(gx3–gx6), which correspond to differences between the adjoining acceleration as to the five sampled time sequential data. Then, an average value "gx0" of these five absolute values is assumed as peak acceleration. With respect to the acceleration of the Y-axis, both a peak interval "ty0" and peak acceleration "gy0" are calculated in a similar manner to that of the X-axis. It should be understood that symbol "abs(x)" is such a symbol for indicating that symbol "x" is equal to an absolute value.

[Data Construction of Walking Pattern DB 51b]

FIG. 4 is a diagram for indicating a data construction of the walking pattern DB 51b.

The records of the walking pattern DB 51b are made by extracting patterns related to walkings from the above-explained action pattern register DB 51a. Similar to the action pattern register DB 51a, this walking pattern DB 51b contains "X-axis acceleration information", "Y-axis acceleration information", and "Z-axis acceleration information", and further, owns respective fields of "walking speed (Km)" and "walking environment." Also, a head field of this walking pattern DB 51b describes "walking pattern name." Since walking pattern names are such names which are exclusively applied to walking patterns, records of the respective walking patterns of the walking pattern DB 51b may be retrieved based upon desirable walking pattern names. Also, the walking environment corresponds to such information related to topographical information of walking places, for instance, "flat land", "gentle downhill slope", "gentle uphill slope" and the like. In this first embodiment mode, this "walking environment" may be automatically extracted/set from a predetermined action pattern name of the action pattern register DB 51a. Alternatively, this "walking environment" may be set by the user himself from a screen displayed on the display unit 45.

[Data Construction of Walking Course DB 51c]

The records of this database 51c are arranged by three fields of "walking course name", "walking course measurement data", and "course outline."

The detailed contents of these three fields are given as follows:

The walking course name - - - name of walking course.

The walking course measurement data - - - data related to all measuring points of the course.

The walking course outline - - - information related to an outline of a walking course.

FIG. 6 is a diagram for indicating an example of the above-explained "walking course measurement data" registered in the records of the walking course DB 51c.

The walking course measurement data 60 shown in this drawing contains 47 measuring points. As to the respective measuring points "1" to "47", such records are registered which are constituted by the respective fields of: "measuring point ID (serial number)", "latitude", "longitude", "walking pattern (walking pattern name)", and "date/time (year, month, day, hour: minute: second)." The date/time data corresponds to a passed time instant of a corresponding measuring point, or a time instant when a user was located at a measuring point 1 corresponding to a starting point. It should also be noted that in the case of the measuring point 1, since a walking is not yet commenced, a walking pattern is not registered. However, assuming now that a stationary pattern corresponds to one sort of walking pattern, this stationary pattern may be registered as a walking pattern. Further, a time required in order that the user walks along the entire walking course is registered in a final record. This required time may be calculated by subtracting the date/time of the measuring point 1 (namely, starting point of course) from the date/time of the measuring point 47 (namely, ending point of course).

[Navigating Operation of First Navigation Apparatus 4]

Next, navigation operations of the above-explained navigation apparatus 4 according to the first embodiment with employment of the above-described arrangement will now be described.

Figure 7:
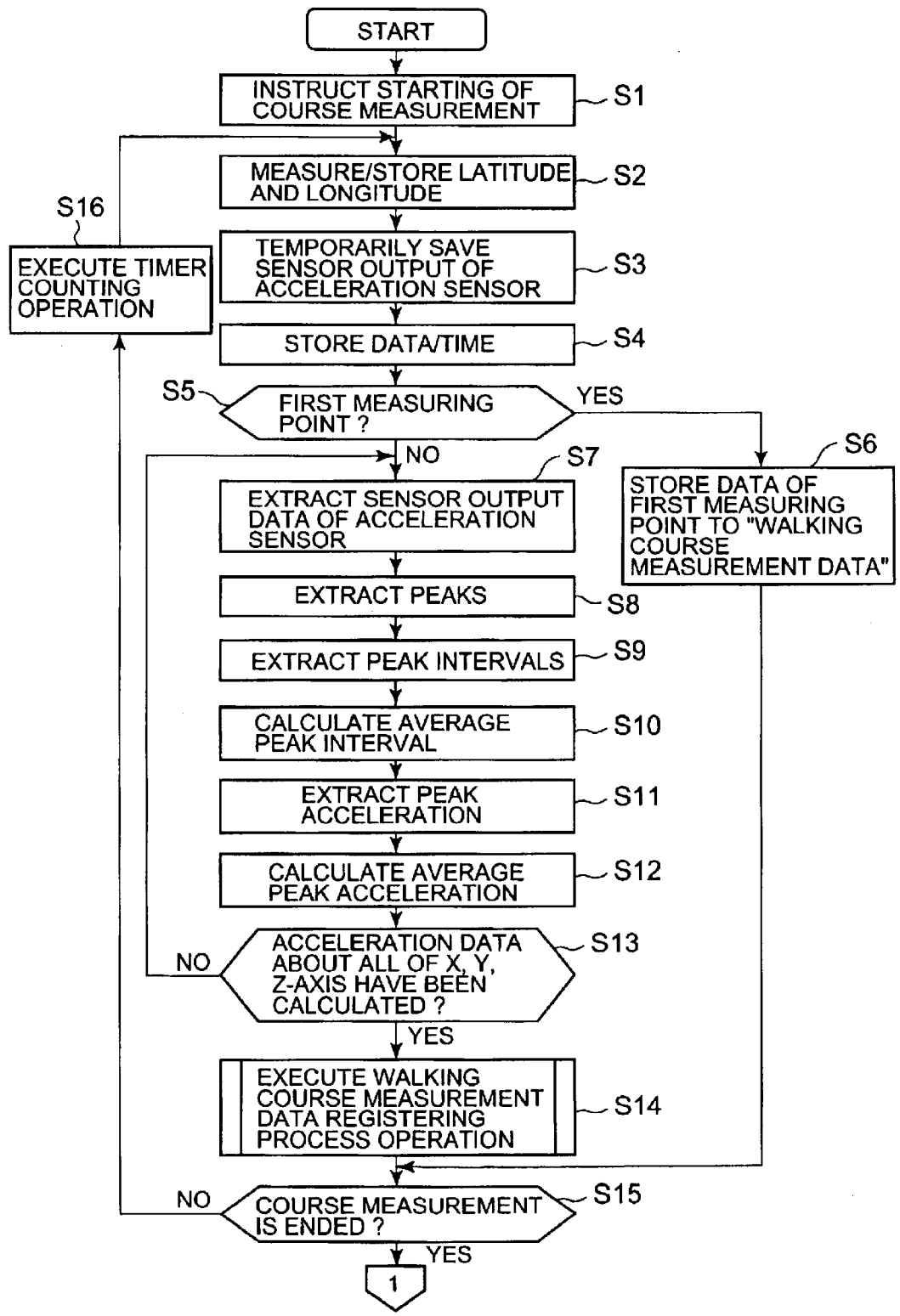
FIG. 7 is a flow chart for describing a major overall operation of the navigation apparatus according to the first embodiment.
Figure 8:
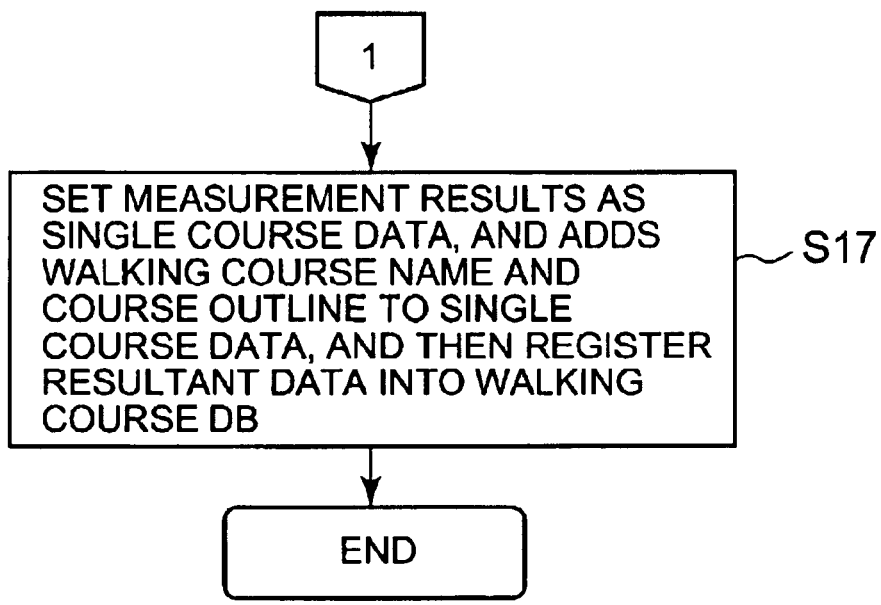
FIG. 8 is a flow chart for explaining a continued major overall operation of FIG. 7.

FIG. 7 and FIG. 8 are flow charts for explaining overall navigation operations of this navigation apparatus 4 according to the first embodiment of the present invention.

Figure 10A:
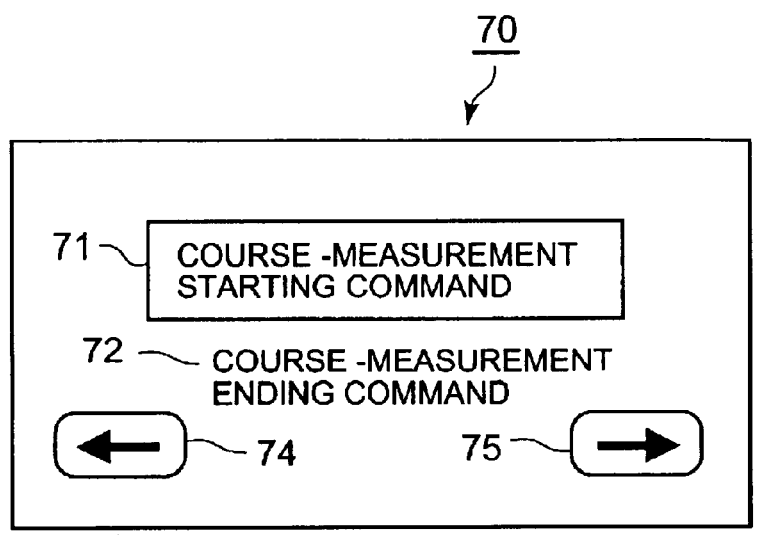
FIG. 10A is a diagram for showing an example of a display screen on which starting, or ending of course measuring operation is instructed.

In such a case that a user who carries this navigation apparatus 4 registers data (namely, walking course data) related to a course along which this user tries to walk, this user firstly designates a commencement of a measuring operation (step S1). This course measurement commencement is made via an instruction screen 70 of either a course-measurement commencement or a course-measurement completion indicated in FIG. 10A. Two designation commands of both a course-measurement-starting command 71 and a course-measurement ending command 72 are displayed on this screen 70. These two commands 71 and 72 may be alternately selected by manipulating both a left cursor button 74 and a right cursor button 75. A selected command may be displayed in a distinguishable manner with respect to the other command by way of a different display color. In the case that the course-measurement commencement is designated, the user selects the course-measurement starting command 71.

Next, both longitude and latitude of a present position are measured by operating the GPS 49, and then, these measured longitude/latitude are stored in the register group 43a of the RAM 43 (step S2). Subsequently, sensor outputs (namely, acceleration components in X-axis, Y-axis, and Z-axis) of the acceleration sensor 50 are temporarily stored in the table 43b of the RAM 43 (step S3). Date/time data read out from the timer 53 is stored in the register group 43a of the RAM 43 (step S4). Next, the CPU 41 judges as to whether or not the present measuring point corresponds to a first measuring point (namely, measuring point 1) (step S5). When the present measuring point corresponds to the first measuring point, the CPU 41 reads out both the "latitude" and "longitude" data measured in the step S2, and the "date/time" data acquired in the step S4 from the register group 43a, and then, stores these data of the measuring point 1 into the table 43b of the RAM 43 (step S6). Thereafter, the navigation process operation is advanced to a step S15.

As explained above, the data as to the measuring point 1, which contains the longitude, the latitude, and the date/time, is stored in the table 43b of the RAM 43.

In the step S15, the CPU 41 judges as to whether or not the course measurement is accomplished (namely, whether or not ending of course measurement is instructed). When ending of the course measurement is not yet instructed, a predetermined time (3 minutes in example of walking course measurement data of FIG. 6) is measured by the timer 53 (step S16). When this time measuring operation is ended, the process operation (main navigation process operation) is returned to the previous step S2. This time measuring operation by the timer 53 is required so as to perform a process operation capable of setting time intervals of measuring points as an equi-interval. This measurement time may be previously set, or may be designated by the user.

Subsequently, the CPU 41 repeatedly executes the process operations defined from the step S2 to the step S4, and then, again judges as to whether or not the present point corresponds to the first measuring point. After this process operation, since the present measuring point constitutes a second measuring point, or succeeding measuring point, the process operation is advanced to a further step S7 subsequent to this step S5.

In this step S7, the CPU 41 extracts sensor output data of the acceleration sensor 50 from the table 43b of the RAM 43. In a step S8, the CPU 41 extracts 6 pieces of peak points in maximum (if 6 peak points cannot be extracted from table 43b, then CPU 41 extracts all of extractable peak points at this stage). Then, the CPU 41 extracts 5 pieces (or "i−1" pieces) of peak intervals from these 6 pieces (or "i" pieces) of peak points in the peak interval calculating process operation 412 in a step S9. It should be noted that symbol "i" is equal to 2 to 5. Then, the CPU 41 calculates an average value of these 5 pieces (or "i−1" pieces) of peak intervals (step S10). Next, the CPU 41 extracts 5 pieces (or "i−1" pieces) of peak acceleration from the above-described 6 pieces (or "i" pieces) of peaks in the peak acceleration calculating process operation 411 in a step S11, and then calculates an average acceleration value of these 6 pieces (or "i−1" pieces) of peak acceleration in a step S12. The process operations defined from the step S7 to S12 are carried out in this order of the respective acceleration components in the X-axis, the Y-axis, and the Z-axis. When the CPU 41 judges that the calculations of both the peak interval and the peak acceleration have been accomplished as to the acceleration components in the respective X, Y, and Z-axes ("YES" in step S13), the CPU 41 executes a "walking course measurement data registering process operation" (will be explained later) so as to temporarily store walking course measurement data into the table 43b of the RAM 43, or to register a walking pattern into the walking pattern DB 51b (step S14). Subsequently, the CPU 41 judges as to whether or not the course measurement is ended, namely, judges as to whether or not the course-measurement ending button 72 is selected/designated (step S15). Then, when the CPU 41 judges that the course measurement is not yet ended ("NO" in step S15), a predetermined time is measured by the timer 53 (step S16). Then, when this time measuring operation is accomplished, the process operation is returned to the previous step S2.

The loop process operation defined from the step S2 to the step S14 is repeatedly executed until the CPU 41 judges that the course measurement is accomplished in the step S13 ("YES" in step S23). At this time, based upon the measuring process operation of the predetermined time by using the timer 53 in the step S16, the above-explained process operation is executed in this predetermined time interval. As a result, the data as to the respective measuring points in the walking course are stored in the table 43b of the RAM 43 in the above-explained predetermined time interval, so that walking course measurement data of this walking course is formed in the table 43b.

When the CPU 41 judges that the course measurement is ended in the step S15, the CPU 41 calculates a time duration required for the walking course based upon the date/time data as to the measuring point 1 (namely, starting point of walking course) and the date/time data of the final measuring point (namely, final point of walking course), which have been so far stored in the table 43b of the RAM 43. While the walking course measurement data formed in the table 43b of the RAM 43 and this required time duration are defined as "walking course measurement data", the CPU 41 adds both a name of this course and an outline of this course to this defined walking course measurement data so as to form walking course data, and then registers this formed walking course data to the walking course DB 51c in a step S17, and accomplishes the process operation.

As previously explained, the walking course data related to one walking course may be formed, and this formed walking course data may be registered in the walking course DB 51c.

[Walking Course Registering Screen 80]

Figure 10B:
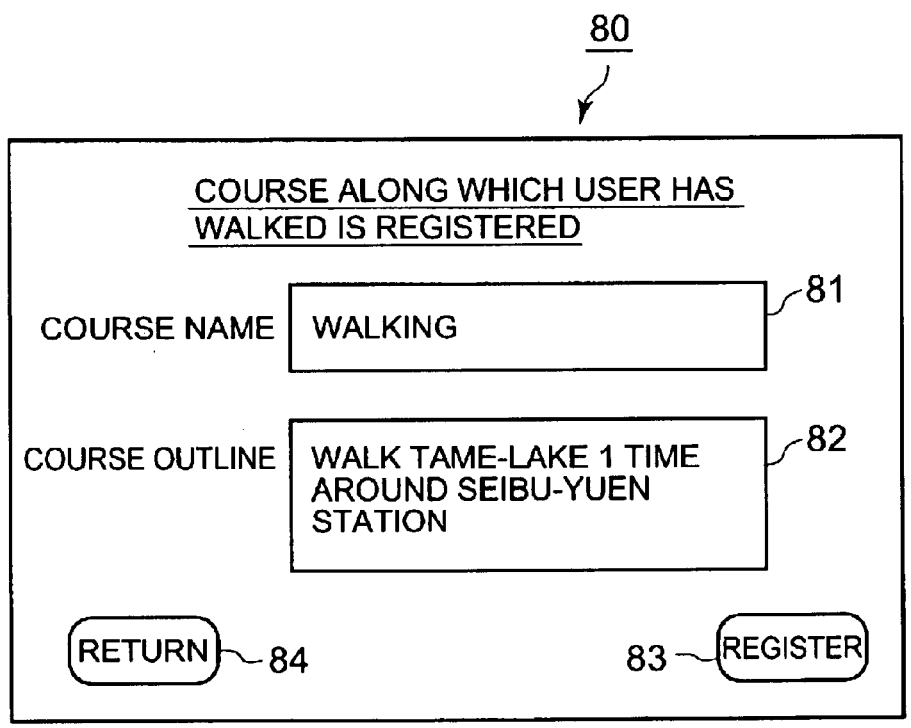
FIG. 10B is a diagram for illustratively representing an example of a course registering display screen.

FIG. 10B is a diagram for illustratively showing an example of a display screen used to register both a "walking course name (course name)" and a "course outline" which are applied to the walking course measurement data in the process operation of the step S17 in the above-described flow chart of FIG. 8.

On this display screen 80, such a message "course along which user has just walked is registered" is displayed, and also, there are indicated a course name input field 81, a course outline input field 82, a register button 83, and a return button 84. The user inputs both a course name and a course outline from the input unit 44 via this registering screen 80 into both the course name input field 81 and the course outline field 82, respectively. In this example of FIG. 10B, "walking" has been entered as the course name, and "walk around TAMA lake 1 time from SEIBU-YUENCHI station" has been inputted as the course outline. These course name and the course outline are registered in the walking course DB 51c by using the mouse of the input unit 44 to click the register button 83. After the user has registered both the course name and the course outline, this user uses the mouse of the input unit 44 to click the return button 84 so as to close the registering screen 80.

[Detailed Walking-Course-Measurement-Data Registering Operation ]

Figure 9:
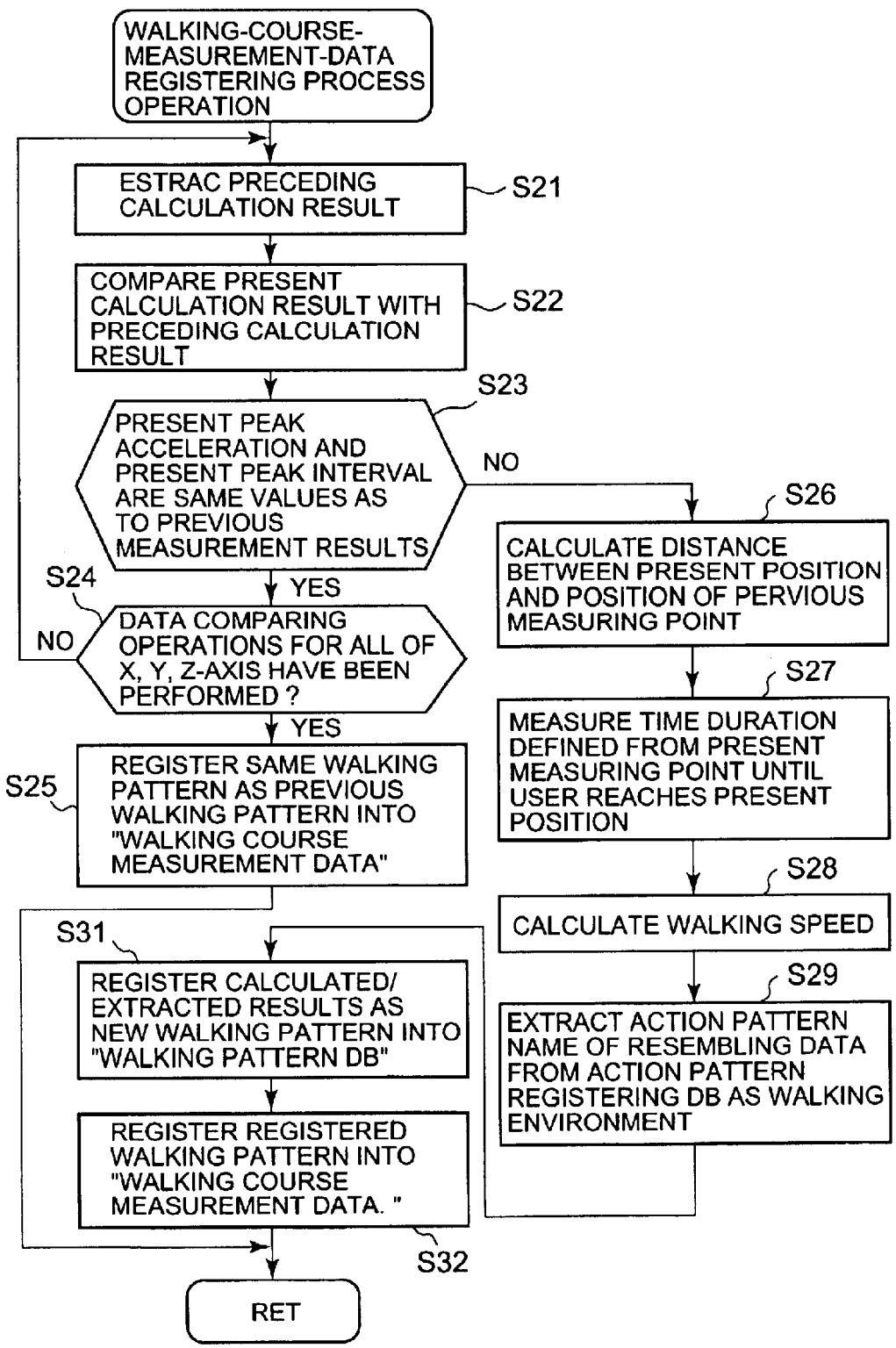
FIG. 9 is a flow chart for explaining a detailed operation as to walking-course-measurement-data registering process operation.

FIG. 9 is a flowchart for describing a detailed process operation as to the walking-course-measurement-data registering process operation defined in the step S12 of the flow chart shown in FIG. 7. Referring now to these flow charts, this walking-course-measurement-data registering process operation will be explained in detail.

First, the CPU 41 extracts the preceding calculation result (both peak acceleration and peak interval) from the register group 43a of the RAM 43 (step S21). Then, the CPU 41 compares a present calculation result (both peak acceleration and peak interval) with the above-described preceding calculation result (step S22) in order to judge as to whether or not the both present peak acceleration and the present peak interval are identical to both the preceding peak acceleration and the preceding peak interval (step S23). The process operations defined from the step S21 to S23 are carried out with respect to each acceleration component in the X, Y, Z-axes.

When either the present peak acceleration or the present peak interval is different from either the preceding peak acceleration or the preceding peak interval as to any acceleration component in any one of the X-axis, Y-axis, and the Z-axis in the step S23, the process operation is advanced to a step S25. On the other hand, if the present peak acceleration and the present peak interval as to any axis to be processed are made coincident with the preceding peak acceleration and the preceding peak interval in the step S23, then the CPU 41 checks as to whether or not the comparing operations between the preceding/present peak acceleration and the preceding/present peak intervals have been carried out with respect to all of the acceleration components in the X-axis, the Y-axis, and the Z-axis (step S24). When these comparing operations are not yet accomplished, the process operation is returned to the previous step S21. In this step S21, the CPU 41 extracts the preceding calculation result of the axis which should be compared in the next comparing operation from the register group 43a of the RAM 43 (step S21). When the CPU 41 judges that the comparing operations between the previous and present peak acceleration and also between the previous and present peak intervals have been accomplished as to all of the acceleration components in the X-axis, the Y-axis, and the Z-axis ("YES" in step S24), the CPU 41 writes the same walking pattern as the preceding walking pattern into the table 43b of the RAM 43 as the data of this measuring point of the walking course measurement data (step S25), and then, this walking-course-measurement-data registering process operation is returned to the main routine.

As previously explained, with respect to the preceding acceleration vector and the present acceleration vector, the CPU 41 judges that there is no change in the walking patterns of the user who carries the navigation apparatus 4, and thus, registers this walking pattern as a walking pattern at this measuring point in the walking course measurement data.

On the other hand, in such a case that either the present peak acceleration or the present peak interval is not made coincident with either the preceding peak acceleration or the preceding peak interval as to any acceleration component in any one of the X-axis, the Y-axis, and the Z-axis in the step S23, the CPU 41 calculates a distance (namely, move distance) between the position of the preceding measuring point and the present position (namely, position of present measuring point (step S26), and acquires a time duration (move time) defined from the position of the preceding measuring point up to the present position of the present measuring point (step S27) Then, the CPU 41 calculates a walking speed of the user who carries the navigation apparatus 4 by dividing the move distance calculated in the step S26 by the move time acquired in the step S27 (step S28).

On the other hand, the calculation of the move distance in the step S26 is carried out by utilizing both latitude data and longitude data acquired from the GPS 49. If both latitude/longitude of a position of a previous measuring point and latitude/longitude of a position of a present measuring point can be grasped, then a move distance between both the preceding measuring point and the present measuring point may be calculated by applying the principle of trigonometric survey (triangulation). Also, the move time in the step S27 may be measured by the timer 53. A method of executing these process operations may be easily conceived by those skilled in the art.

Subsequent to the step 28, while both the peak acceleration and the peak intervals in the X-axis component, the Y-axis component, and the Z-axis component of the present acceleration are employed as a key, the CPU 41 retrieves the content of the action pattern register DB 51a in order to extract an action pattern name of such data (record) having the highest resemblance to the present acceleration vector, and then, sets this extracted action pattern name as the action environment of the present measuring point (step S29). Then, the CPU 41 registers the present calculation/extraction results (peak acceleration and peak intervals of acceleration components in X-axis, Y-axis, and Z-axis, walking speeds, and walking environments) as a new walking pattern into the walking pattern DB 51b (step S31), and then, stores this registered walking pattern into the table 43b of the RAM 43 as walking pattern information of the present measuring point of the walking course measurement data (step S32). Thereafter, this process operation is returned to the main routine.

As previously explained, in the walking-course-measurement-data processing operation, as to one measuring point, a walking pattern is determined in the above-described manner, and this determined walking pattern is registered into the relevant measuring point data of the walking course measurement data which is being formed in the table 43b of the RAM 43.

[Action Pattern Registering Process Operation]

Figure 11:
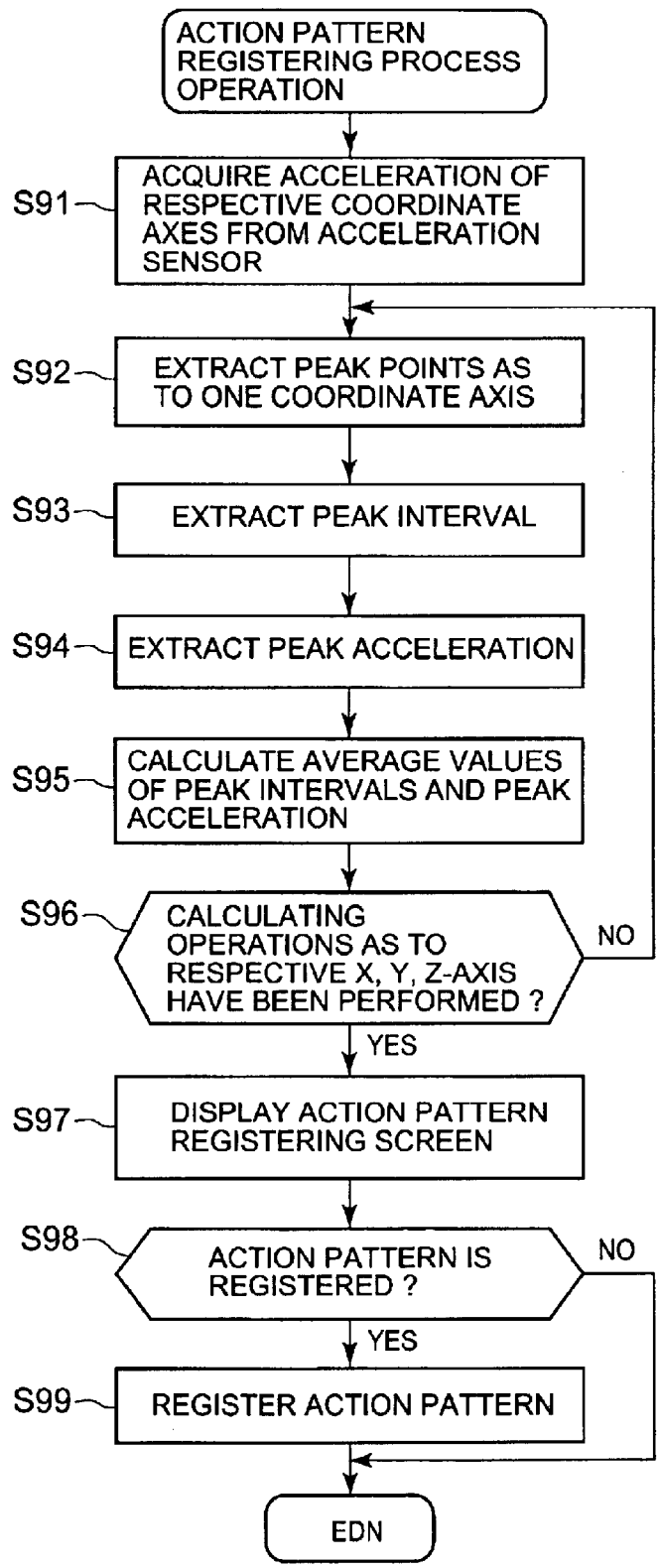
FIG. 11 is a flow chart for describing an action registering process operation executed in the navigation apparatus of the first embodiment.

FIG. 11 is a flow chart for describing an action pattern registering process operation for registering an action pattern into the action pattern register DB 51a shown in FIG. 2.

First, acceleration components of the x-axis, the Y-axis, and the Z-axis are acquired from the acceleration sensor 50 (step S91).

Subsequently, the CPU 41 executes the below-mentioned process operations defined from a step S92 to a step S95 every one axis in the order of the acceleration components along the X-axis, the Y-axis, and the Z-axis.

The CPU 41 extracts peak points of acceleration components stored in the register group 43a of the RAM 43 (step S92). The CPU 41 extracts a peak interval based upon the extracted peak points (step S93), and further, extracts peak acceleration (step S94). Then, the CPU 41 calculates average values as to the extracted peak intervals and also the extracted peak acceleration (step S95).

Next, the CPU 41 judges as to whether or not the averaged values of the peak intervals and of the peak acceleration are calculated as to all of the acceleration components in the X-axis, the Y-axis, and the Z-axis (step S96). If such an averaged value calculation is not yet completed, then the process operation is returned to the previous step S91. In this step S91, the CPU 41 executes the process operations defined from the step S92 to S95 as to such an acceleration component in an axis in which the average value calculation has not yet been ended.

Then, when the CPU 41 judges in the step S96 that both the peak intervals and the peak acceleration as to all of the acceleration components in the X-axis, the Y-axis, and the Z-axis have been calculated, an action pattern registering screen is displayed on the display unit 45 (step S97).

Since the process operations defined from the step S91 to the S96 are carried out, both the peak interval and the peak acceleration of the present acceleration vector of the user who carries the navigation apparatus 4 along each direction of the X-axis, the Y-axis, and the Z-axis may be calculated. These calculation results are displayed on the above-explained action pattern registering screen 101.

[Action Pattern Registering Screen 101]

Figure 12:
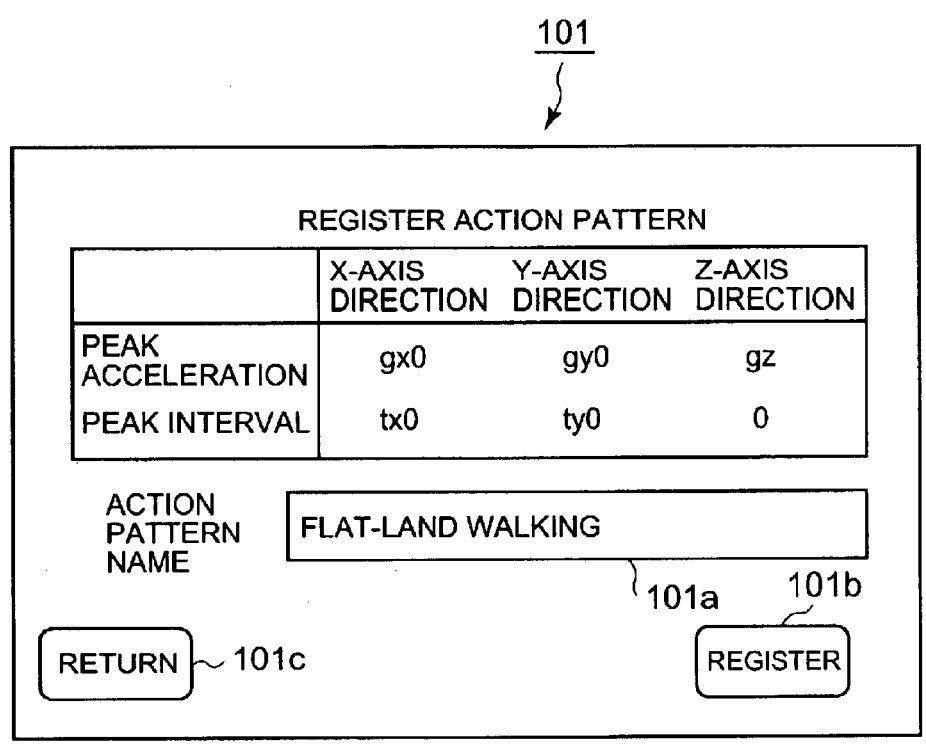
FIG. 12 is a diagram for illustratively indicating a display example of an action registering display screen of the first embodiment.

FIG. 12 is a diagram for illustratively showing an example of this action pattern registering screen 101.

On this action pattern registering screen 101 shown in this drawing, the above-described peak intervals and peak acceleration along the respective directions of the X-axis, the Y-axis, and the Z-axis are displayed, and an action pattern name input field 101a, a register button 101b, and a return button 101c are displayed below these peak intervals and peak acceleration.

The user who carries the navigation apparatus 4 enters a walking pattern name such as a "flat-land walking" and other action patterns via the input unit 44 into the action pattern name input field 101a by confirming the peak acceleration values and the peak interval values along the three axial directions, which are displayed on the action pattern registering screen 101. Then, when the input operation of the action pattern name input field 101a is ended, this user uses the mouse of the input unit 44 to click the register button 101b, and thereafter to click the return button 101c in a similar manner.

As previously explained, an action pattern is registered while the peak acceleration and the peak intervals as to the acceleration components in the X-axis, the Y-axis, and the Z-axis are employed as attribute values.

Subsequent to the step S97, the CPU 41 judges as to whether or not the action pattern has been registered via the action pattern registering screen 101 (step S98). If the action pattern has been registered, then the CPU 41 registers the name of this action pattern in the action pattern register DB 51a in correspondence with the extracted peak intervals and the extracted peak acceleration of the three-axial directions of the X-axis, the Y-axis and the Z-axis (step S99).

In accordance with the above-described manner, the action patterns such as the walking patterns are registered into the action pattern register DB 51a by the user who carries the navigation apparatus 40.

As previously described in detail, in the navigation apparatus 4 of this first embodiment of the present invention, while the user of this navigation apparatus 4 is carrying such a navigation apparatus 4, since this user walks, the positions (longitude and latitude), the walking patterns, and the passed date/time may be registered every measuring point with respect to various walking courses. Furthermore, the walking course data into which the walking time required for this registered course can be formed/registered.

[Hardware Construction of Second Navigation Apparatus]

A navigation apparatus according to a second embodiment of the present invention will now be explained.

A hardware structure of this navigation apparatus according to the second embodiment is similar to that of the first embodiment, as represented in FIG. 1.

In this navigation apparatus of the second embodiment, when a user who carries this second navigation apparatus walks along the course registered in the above-described first embodiment, the second navigation apparatus monitors as to whether or not this user deviates from the registered course. When the user deviates from the registered course, this second navigation apparatus notifies this course deviation, or a route for returning to the registered course to the user. Also, the second navigation apparatus compares a present walking pace with the walking pace when the course is registered, and continuously notifies walking pace conditions to the user.

It should be understood that while a computer program different from the above-described computer program of the first embodiment has been previously stored in the ROM 42, the CPU 41 executes this specific computer program so as to perform the above-explained operations specific to this second embodiment.

[Overall Navigation Operation of Second Nabigation Apparatus]

Figure 13:
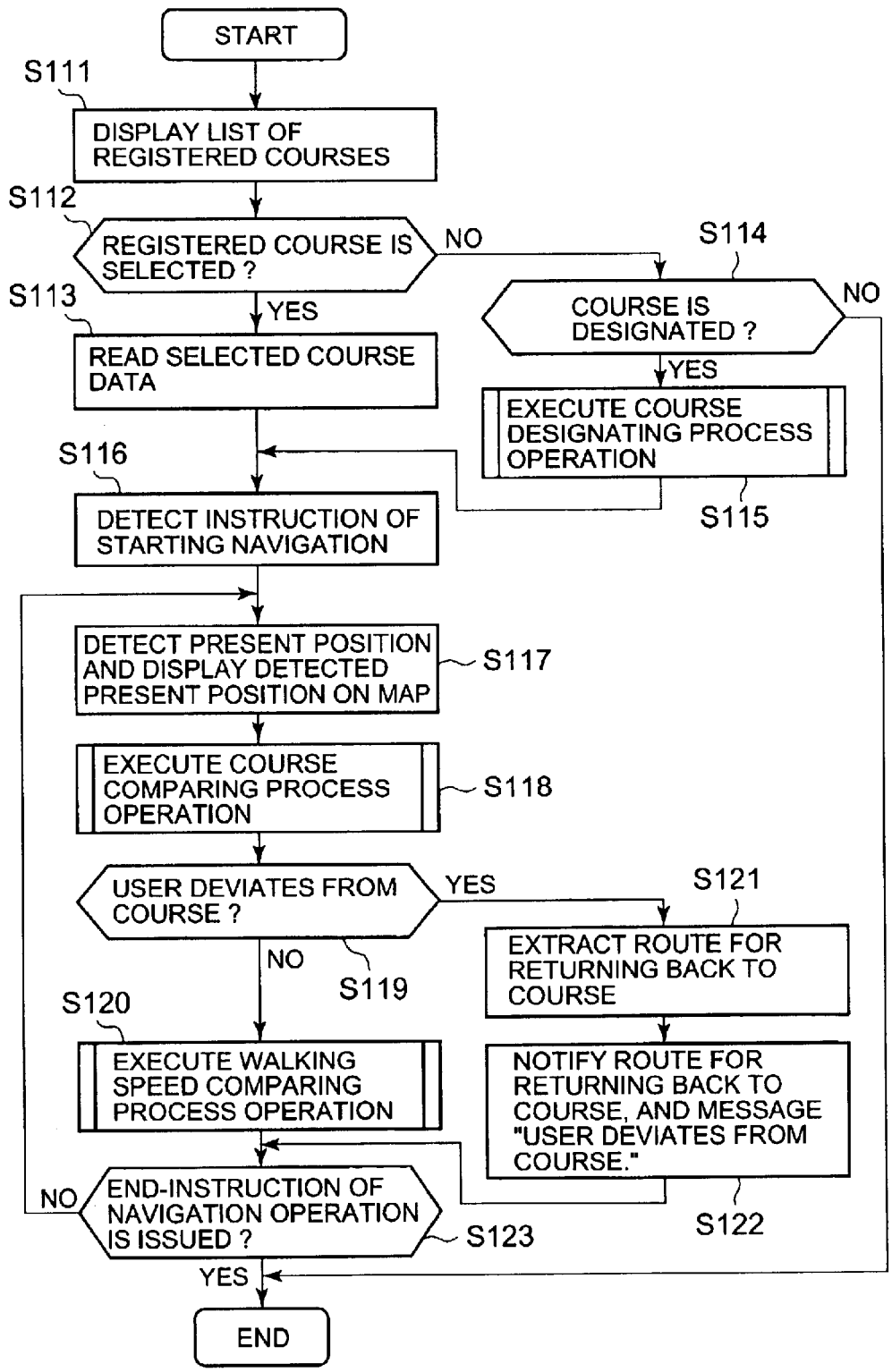
FIG. 13 is a flow chart for explaining an entire process operation of a navigation apparatus according to a second embodiment of the present invention.

FIG. 13 is a flow chart for explaining an overall navigation operation of the navigation apparatus according to the second embodiment mode of the present invention. It should be noted that since a system structure of this second embodiment is similar to that of the first embodiment shown in FIG. 1, explanations thereof are omitted.

In this second embodiment, first, a list of courses (namely, walking courses) which have been registered is displayed on the display unit 45 (step S111). In this case, the CPU 41 retrieves walking courses which have been registered in the walking course DB 51c, and displays titles of courses (walking course names) in a list form, which have been registered in this walking course DB 51c.

Figure 14:
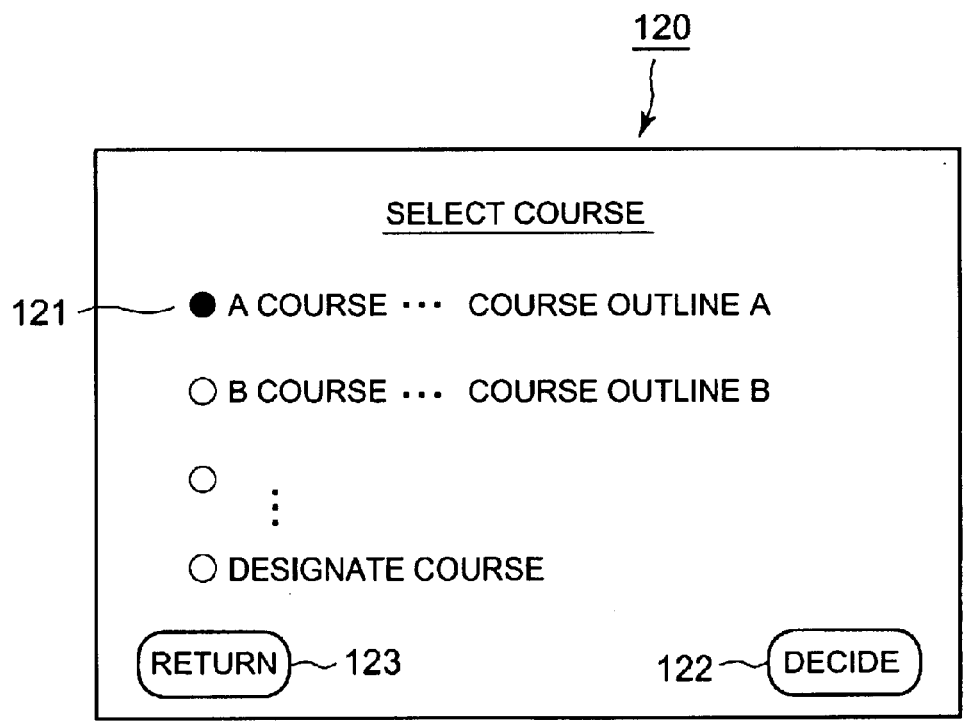
FIG. 14 is a diagram for illustratively indicating a display example of a course selecting display screen of the navigation apparatus according to the second embodiment.

FIG. 14 is a diagram for illustratively showing an example of this course list display screen 120.

On the course list display screen 120 shown in this drawing, such a message of "please select course" is displayed on an uppermost display portion thereof; titles of courses which have been registered as "course A", "course B", - - -, are displayed in combination with outlines of these courses under this uppermost display portion; and also, an item of "course is designated" is displayed after these display portions. This item is used to instruct an execution of a "course designating process operation" (will be explained later). Circular-shaped check boxes 121 are displayed in correspondence with both the course titles and the item "course is designated." Since any one of the check boxes 121 is clicked by using the mouse of the input unit 44, either the course corresponding to this clicked check box 121 or the above-explained item is selected. Either the course or the above-described item, which have been selected in the above-described manner, may be determined (designated) by clicking a decision button 122 displayed on a lower right display portion of this course list display screen 120. As explained above, after the user of this second navigation apparatus has selected/determined the desirable walking course, or has selected/determined "course designation", the user may close the course list display screen 120 by using the mouse to click the return button 123. It should also be noted that when the user uses the mouse to click the return button 123 without clicking the decision button 122, none of these courses is selected/determined.

Referring back to the flow chart of FIG. 13, the navigation process operation of the second embodiment will be continued.

Subsequent to the step Sill, the CPU 41 judges as to whether or not such a course (namely, course registered in walking course DB 51*c*) is selected (step S112). When this registered course is selected, the CPU 41 reads out course data of this selected course from the walking course DB 51*c* (step S113). On the other hand, when the CPU 41 judges that the registered course is not selected in the step S112, the CPU 41 further judges that a course designation is made (step S114). When such a course designation is not made, this navigation process operation is accomplished. To the contrary, when the course designation is made, the CPU 41 executes a "course designation process operation" (will be explained later) (step S115).

When the CPU 41 detects an instruction for commencing a navigation operation in a step S116 subsequent to the process operation defined in either the step S113 or the step S115, the CPU 41 detects a present position based upon reception data of the GPS 49 by the position calculating process operation 41*a*, and then, displays this detected present position of a map (step S117).

Figure 15:
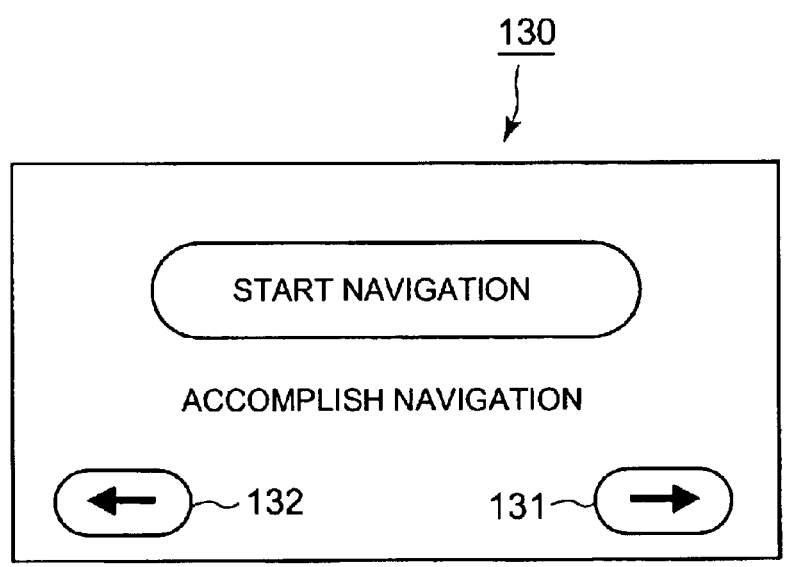
FIG. 15 is a diagram for illustratively representing an example of a display screen on which starting, or ending of navigation operation is instructed in the second embodiment.

FIG. 15 is a diagram for illustratively showing a display screen used to instruct a commencement of a navigation operation and a completion of a navigation operation.

On a navigation starting/ending instruction screen 130 shown in FIG. 15, both an item "start of navigation" and another item "end of navigation" are displayed on an upper display portion and a lower display portion. These items are alternately selected by using the mouse of the input unit 44 to click a right cursor button 131 and a left cursor button 132, which are displayed on a right corner and a left corner of this instruction screen 130.

Subsequent to the above-described step S117, the CPU 41 performs a "course comparing process operation" in a step S118. In this course comparing process operation, the CPU 41 detects as to whether or not the user who carries this navigation apparatus 4 deviates from either a selected course or a designated course (will be commonly referred to be "courses" in aberration manner). A detailed explanation of this "course comparing process operation" will be described later.

The CPU 41 judges as to whether or not the user who carries the navigation apparatus 4 deviates from the course based upon the comparison result of "course comparing process operation " (step S119). If the user does not deviate from this course, the CPU 41 executes a "walking speed comparing process operation" in a step S120. In this "walking speed comparing process operation", the CPU 41 compares a walking pace of the user who carries the navigation apparatus 4 with the walking space defined when the course is registered (including walking pace which is automatically registered in step S115).

On the other hand, when the CPU 41 judges that the user deviates from the course in the above-described step S119, the CPU 41 extracts a route from the map information DB 42*a* (step S121), while this route may cause the user to be returned to the original course. Thus, the CPU 41 notifies this fact to the user who carries the navigation apparatus 4 by displaying the route for returning the user back to this original course on the map, and also notifies such a message of "course deviation" to the user who carries the navigation apparatus 4 via the display unit 45 (step S122).

Subsequent to either the step S120 or the step S122, the CPU 41 judges as to whether or not ending of the navigation operation is instructed (step S123). When ending of the navigation operation is not instructed, the process operation is returned to the previous step S117. As previously explained, this completion of the navigation operation may be instructed via the navigation starting/ending instruction screen 130 of FIG. 14 and the like.

As explained above, the process operations defined from the step S117 to the step S123 are repeatedly carried out until the CPU 41 judges that the user who carries the navigation apparatus 4 instructs the completion of the navigation operation. Since this loop process operation is executed, while the user who carries the navigation apparatus 4 walks along the course, the present position of the user who carries the navigation apparatus 4 may be displayed on the map on the screen of the display unit 45, and also, when this user deviates from this course, this course deviation and the route for returning back to the original course may be notified to this user. Also, the walking pace of the user who carries the navigation apparatus 4 is continuously compared with the walking pace defined when the course is registered, so that such an advice that the walking speed becomes faster, or slower may be notified to the user.

Then, when the CPU 41 judges that the completion of the navigation operation is instructed in the step S123, this navigation process operation is accomplished.

[Course Comparing Process Operation]

Figure 16:
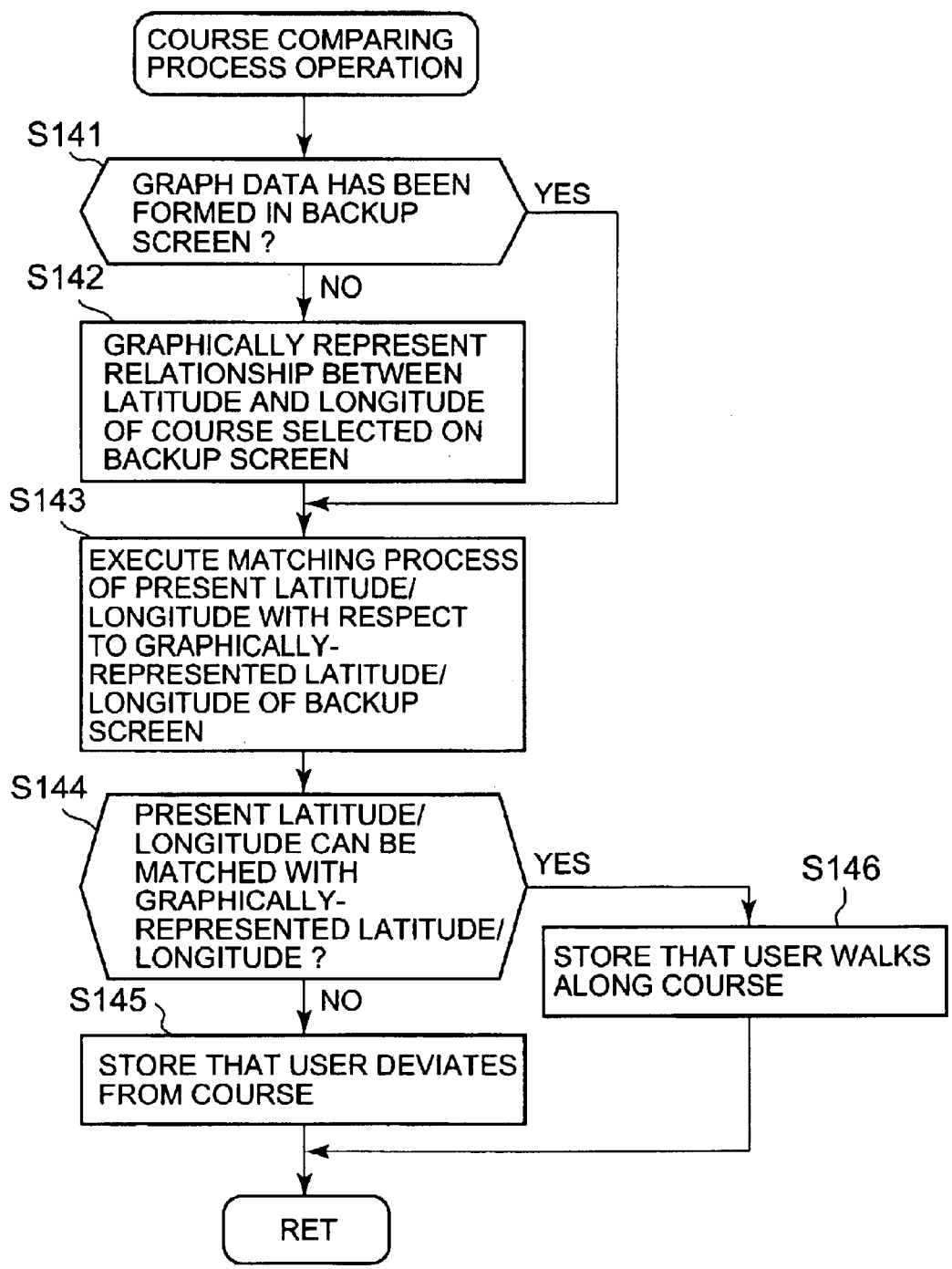
FIG. 16 is a flow chart for explaining a detailed operation of the course comparing process operation shown in FIG. 13.

FIG. 16 is a flow chart for explaining a detailed process operation as to the course comparing process operation defined in the step S118 of the flow chart of FIG. 13.

In this course comparing process operation, firstly, the CPU 41 judges as to whether or not such a graph data has been formed in a predetermined storage area of the RAM 43 in a step S141. This graph data plots a course selected on a two-dimensional rectangular coordinate plane in which an ordinate thereof indicates latitude and an abscissa thereof shows longitude. If this graph data has not yet been formed in the predetermined area of the RAM 43, then the CPU 41 forms the graph data of the above-explained selected course in the predetermined area of the RAM 43 (step S142).

Figure 17:
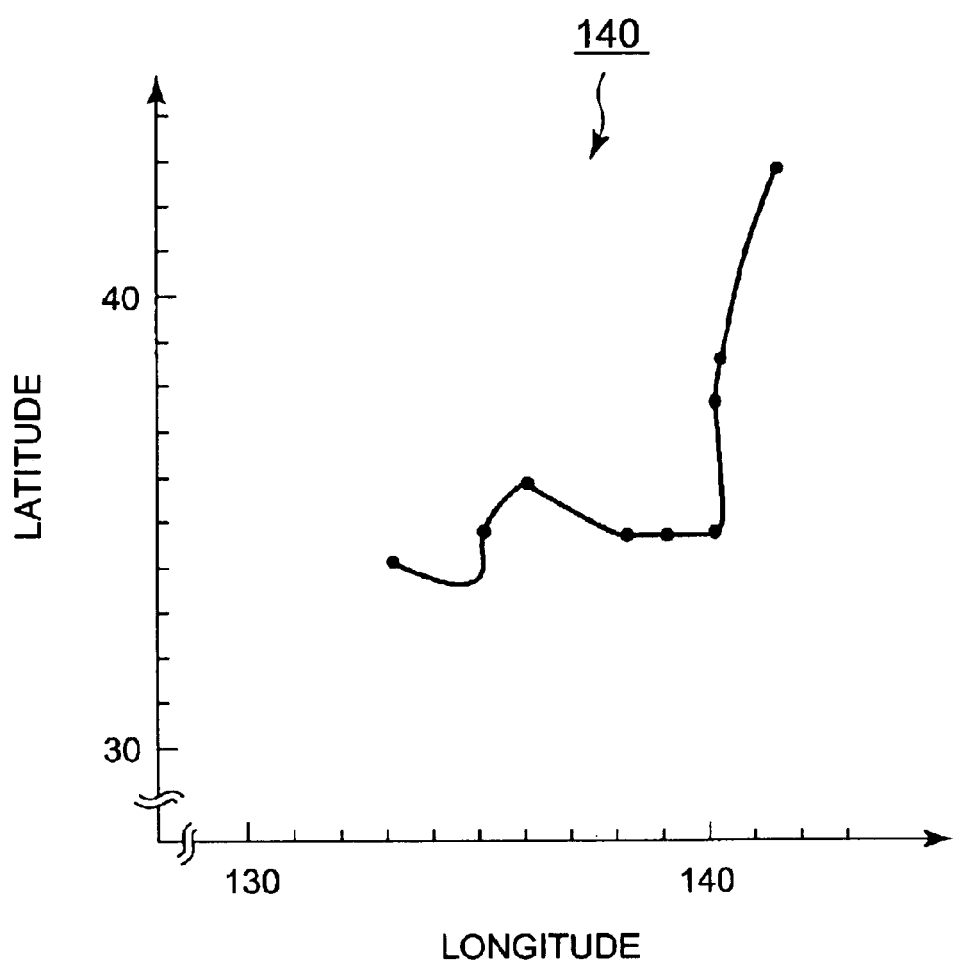
FIG. 17 is a graphic representation for graphically showing a route (path) of a course expressed by latitude and longitude.

FIG. 17 is a diagram for graphically showing an example of this graph data.

The graph data 140 shown in this drawing represents a route (path) of a course of a region defined within such a range that latitude is selected between 30 degrees and 43 degrees and longitude is selected between 130 degrees and 142 degrees. This graph data 140 is formed in such a manner that positional information (latitude and longitude) of respective measuring points of walking course measurement data is plotted on a latitude-longitude plane, and spaces among these plotted points (indicated by black solid circles in FIG. 17) are interpolated by way of a spline curve and the like.

After the process operation defined in the step S143 has been executed, or the CPU 41 judges "NO" in the step S141, the CPU 41 performs a matching process operation defined in a step S143 for present latitude and present longitude of the user who carries the navigation apparatus 4 with respect to the above-explained graph data, while both the present latitude and the present longitude are acquired from the reception data of the GPS 49. Then, the CPU 41 judges as to whether or not the present latitude and the present longitude can be matched with the graph data (step S144). This matching process operation is carried out in order to investigate as to whether or not the present position (latitude and longitude) of the navigation apparatus 4 is present on the selected course. When the present position of the user who carries the navigation apparatus 4 is matched with the graph data, the CPU 41 may judge that the user who carries the navigation apparatus 4 is located on the course under selection.

When the CPU 41 judges that the present position of the user cannot be matched with the graph data in the step S144, the CPU 41 stores such a data that "the user deviates from the course" into the register group 43a of the RAM 43 (step S145). To the contrary, when the CPU 41 judges that the present position of the user can be matched with the graph data in the step S144, the CPU 41 stores such a data that "the user is walking along the course" into the register group 43a of the RAM 43 (step S146). When either the process operation in the step S145 or the process operation in the step S146 is accomplished, the process operation is returned to the main routine.

As previously explained, in accordance with the course comparing process operation, the route of the selected course is expressed as the graphic data which is formed by plotting/interpolating the positional information of this course route on the rectangular coordinate system where the ordinate indicates the latitude and the abscissa shows the longitude based upon this posiitonal information (latitude and longitude). Since the CPU 41 judges as to whether or not the present position (latitude and longitude) of the user of the navigation apparatus 4 can be matched with the above-described graph data, the CPU 41 may judge as to whether this user of the navigation apparatus 4 deviates from the course, or walks along this course, and then, stores this judgement result into the register group 43a of the RAM 43.

[Walking Speed Comparing Process Operation]

Figure 18:
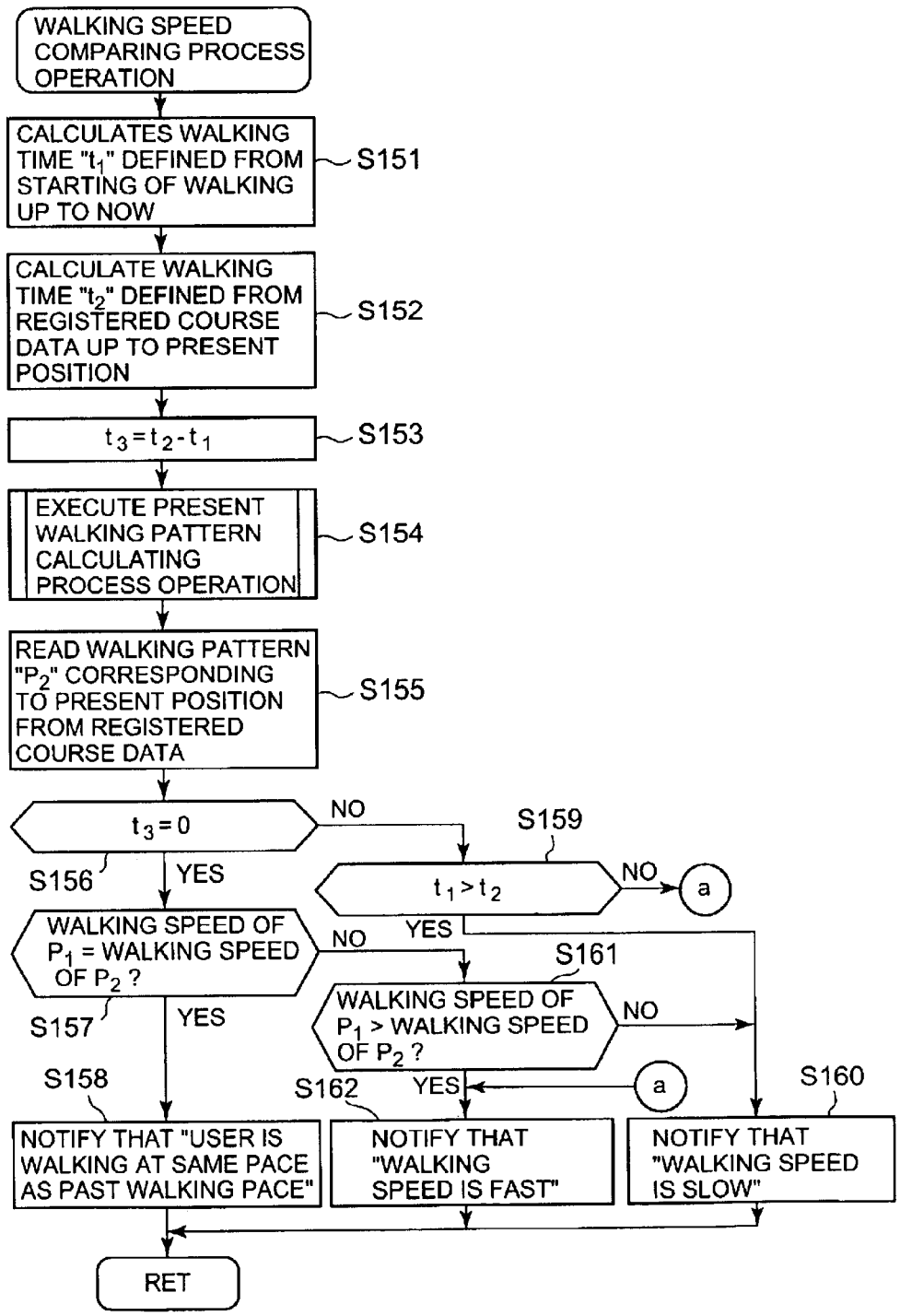
FIG. 18 is a flow chart for explaining a detailed operation of a walking-speed comparing process operation shown in FIG. 13.

FIG. 18 is a flow chart for explaining a detailed process operation as to the above-described "walking speed comparing process operation" defined in the step S120 of the flow chart of FIG. 13.

In this process operation, a walking time duration "t1" defined from a start of walking up to a present time is calculated by the timer 53 (step S151). Next, the CPU 41 calculates a walking time duration "t2" at a present position of the user who carries the navigation apparatus 4 based upon course data (namely, data of selected course) registered in the walking course DB 51c (step S152).

This walking time duration "t2" corresponds to a move time duration measured from a walking start point (measuring point 1) when the course is registered until the present position, and may be calculated by referring to walking course measurement data contained in the course data. That is to say, the CPU 41 extracts course data of such a measuring point "i" (symbol "i" being natural number) which is made coincident with the present position, or is located at the nearest position as to this present position, and the CPU 41 acquires date/time data of the present position when the course data is registered based upon date/time data of this measuring point "i." In this case, when the present position is not made coincident with the measuring point "i", the CPU 41 also refers to such a course data of a measuring point "i−1" immediately before this measuring point "i", and then, predicts date/time of the present position when the course data is registered while considering the date/time data and the positional information as to both the measuring point "i" and the measuring point "i−1." Then, this walking time duration Y"t2" may be calculated by subtracting the date/time data of the measuring point "1" from either the date/time data of the measuring point "i" or the date/time obtained from this prediction.

Then, the time "t1" is subtracted from the time "t2" to obtain-a subtraction result "t3" in a step S153. This time "t3" corresponds to a difference between the walking time up to the present position when the course is registered into the walking course DB 51c and the walking time up to the present position in the case that the user presently walks along this course. As a result, when t3=0, it can be regarded that the user who carries the navigation apparatus 4 walks along the course at the same walking pace as that when the course is registered. When the subtraction result "t3" is equal to any number other than "0", it can be regarded that the present walking pace is different form that when the course is registered.

Next, the CPU 41 executes a "present walking pattern calculating process operation" (will be explained later) so as to calculate a present walking pattern "P1" of the user who carries the navigation apparatus 4 (step S154). Subsequently, the CPU 41 retrieves the walking course DB 51c in order to acquire a walking pattern "P2" at the present position when the course is registered (step S155). This retrieving operation may be realized by that while the present position (latitude and longitude) is used as a key, the walking course measurement data within the course data is retrieved. Then, the CPU 41 finds out a walking pattern at the present position when the course is registered from this retrieved walking course measurement data.

Next, the CPU 41 judges as to whether or not the time "t3"=0 (step S156). When the time "t3"=0, the CPU 41 checks as to whether or not the walking speed of the walking pattern P1 is equal to the walking speed of the walking pattern P2 (step S157). When these walking speeds are made coincident with each other, the CPU 41 notifies such a message that "user is walking at same pace as past walking pace" via the display unit 45 (step S158). Then, the process operation is returned to the main routine. In this case, for example, the CPU 41 notifies such a message 165 that "user is walking at same pace as preceding walking pace" as showing FIG. 19A.

On the other hand, when the CPU 41 judges that the time "t3" is not equal to 0 in the step S15.6, the CPU 41 further judges as to whether or not t1>t2 (step S159). When t1>t2, the CPU 41 notifies such a message that "walking speed is slow" via the display unit 45 (step S160). Then, the process operation is returned to the main routine. In this case, for example, the CPU 41 notifies such a message 167 that "walking pace becomes slightly slower than preceding walking pace" as indicated in FIG. 19C.

Also, when the CPU 41 judges that t1<t2 in the step S159, the CPU 41 notifies such a message that "walking speed is fast" via the display unit 45. (step S162). Then, the process operation is returned to the main routine. In this case, for instance, the CPU 41 notifies such a message 166 that "walking pace becomes slightly faster than preceding walking pace" as shown in FIG. 19B.

Furthermore, when the CPU 41 judges that the walking speed of the walking pattern P1 is not equal to the walking speed of the walking pattern P2 in the step S157, the CPU 41 judges as to whether or not the walking speed of the walking pattern p1 is faster than the walking speed of the walking pattern P2 (step S161). When the judgement result becomes "YES", the CPU 41 notifies such a message that "walking speed is fast" via the display unit 45 (step 162). Then, the process operation is returned to the main routine. In this case, the CPU 41 notifies such a message 166 that "walking pace becomes slightly faster than preceding walking pace" as shown in FIG. 19B.

The comparing operation between the walking speeds in the step S161 is carried out in such a manner that the walking pattern DB 51b is retrieved so as to read out both the walking speed of the walking pattern P1 and the walking speed of the walking pattern P2. It should also be noted that when the walking pattern P1 is not registered in the walking pattern DB 51b, the walking speed in the walking pattern P1 may be predicted by the known technique based upon both the average value of the peak intervals and the average value of the peak acceleration of the walking pattern "P1" which have been calculated by the "present walking pattern calculating process operation" defined in the step S154.

As previously explained, in this "walking speed comparing process operation", while the timer 53 measures the time duration "t1" which is required by the user who moves from the starting point of the course up to the present position, the CPU 41 compares this move time "t1" with the move time "t2" defined up to the present position when the course is registered so as to monitor the walking pace of this user who carries the navigation apparatus 4 at the present time instant, and then, the CPU 41 notifies the proper message in response to this monitored walking pace to this user. Also, even in such a case that the move time required up to the present position is equal to the move time when the course is registered, the CPU 41 further judges the present walking pattern of the user who carries the navigation apparatus 4, and then compares the walking speed of this judged walking pattern with the walking speed of the walking pattern at the present position when the course is registered, so that the CPU 41 predicts a future walking pace of the user who carries the navigation apparatus 4, and notifies the proper message as to the walking pace to the user who carries the navigation apparatus 4 by considering this predicted walking pace.

[Present Walking Pattern Calculating Process Operation]

Figure 20:
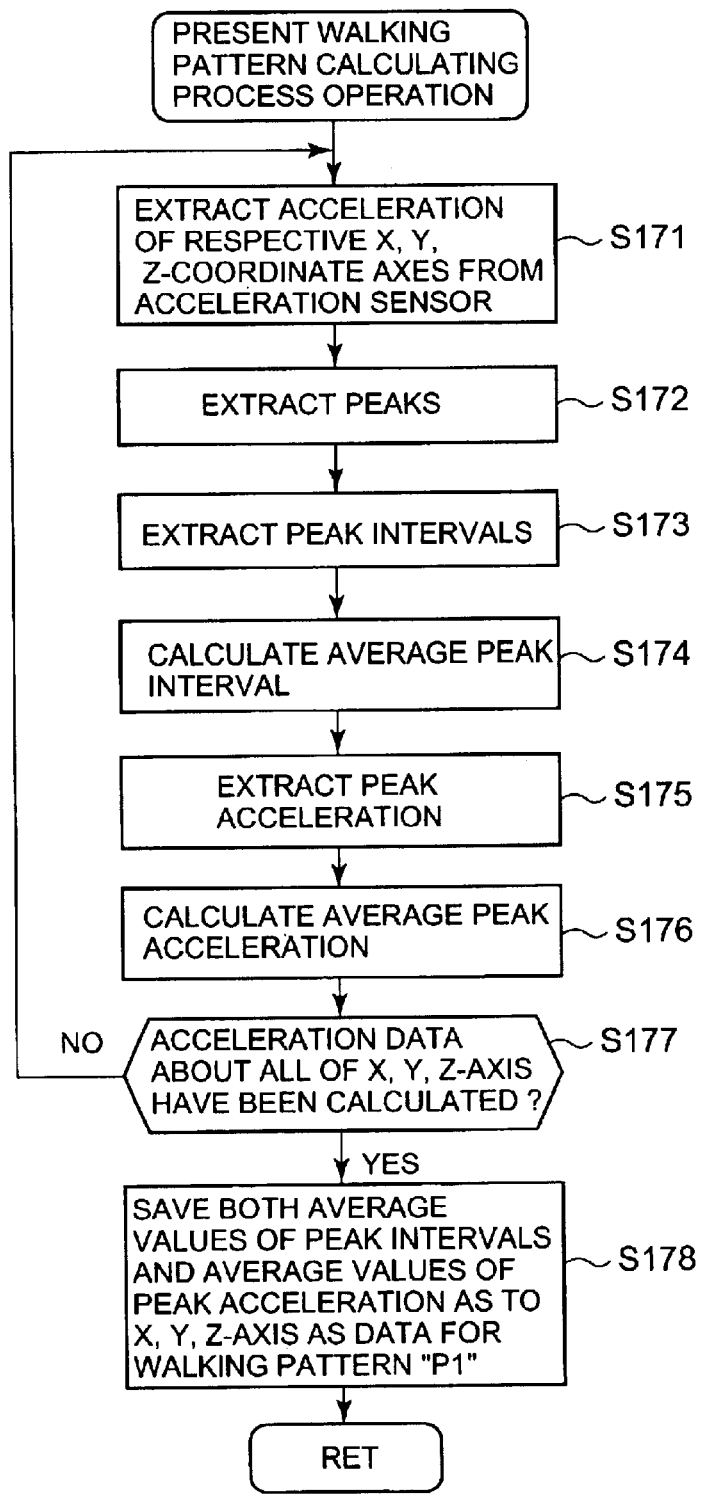
FIG. 20 is a flow chart for explaining a detailed operation of the present-walking-pattern calculating process operation of FIG. 18.

FIG. 20 is a flow chart for explaining a detailed process operation with respect to the above-explained "present walking pattern calculating process operation" defined in the step S155 of the flow chart of FIG. 18.

Since process operations defined from a step S171 to a step S177 of FIG. 20 are similar to those defined from the step S7 to the step S13 of the flow chart shown in FIG. 7 of the first embodiment, a detail explanation as to these process operations defined from the step S171 to the step S177 is omitted. Since the process operations defined from the step S171 to the step S177 are executed, the CPU 41 calculates average values of peak intervals and average values of peak acceleration as to acceleration of the user who carries the navigation apparatus 4 along the respective directions of the X-axis, the Y-axis, and the Z-axis.

Then, the average values of the peak intervals and the average values of the peak acceleration as to the respective acceleration components of the X-axis, the Y-axis, and the Z-axis are stored as data of a walking pattern "P1" in the register group 43a of the RAM 43 (step 178). Then, the process operation is returned to the main routine.

As previously explained, since the "present walking pattern calculating process operation" is executed, the present walking pattern "P1" (namely, average value of peak interval and average value of peak acceleration) of the user who carries the navigation apparatus 4 is calculated.

[Course Designating Process Operation]

Figure 21:
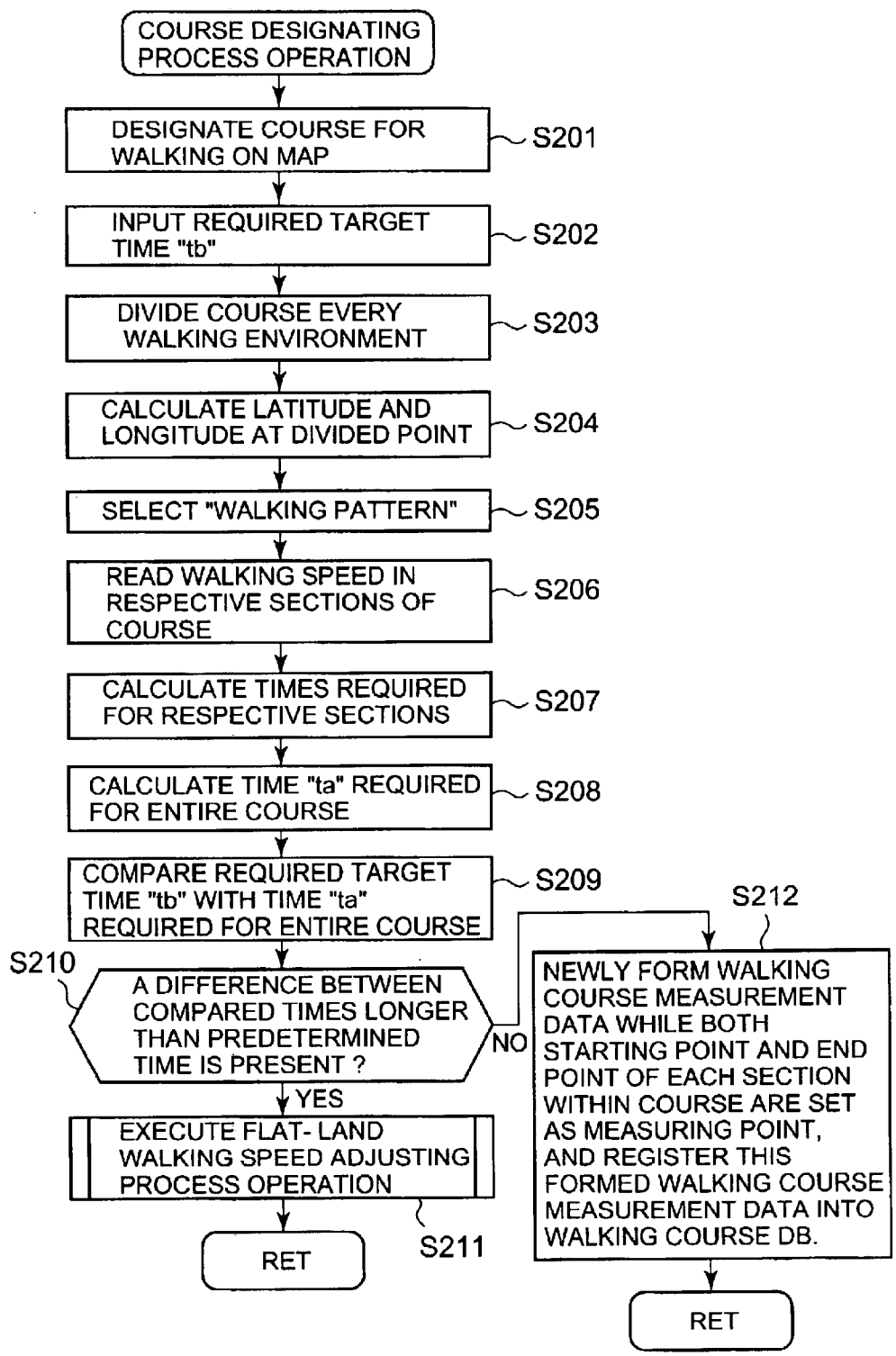
FIG. 21 is a flow chart for explaining a detailed operation of the course designating process operation of FIG. 13.

FIG. 21 is a flow chart for describing a detailed process operation of the above-explained "course designating process operation" defined in the step S112 of the flow chart shown in FIG. 13.

In this course designating process operation, the user who carries the navigation apparatus 4 firstly designates a course along which this user walks on the map displayed on the display unit 45 (step S201). This course designation may be carried out by, for instance, tracing the map displayed on the display unit 45 by the user who uses an electronic pen provided with the input unit 44. In this case, a map portion of the map, which is traced by the electronic pen, is designated as the course along which the user walks. Alternatively, other than this electronic pen, while the user manipulates a pointing device such as a mouse so as to move a cursor on the map displayed on the display unit 45, the user may designate the course along which this user walks.

Next, the user inputs a target time "tb" when this user walks along the designated course via the display screen of the display unit 45 (step S202). Subsequently, the course designated in the step S201 is subdivided in the unit of a walking environment in a step S203. In this course subdivision, the CPU 41 sequentially investigates the walking environment of the entire course which has been designated from the starting point based upon the map information registered in the map information DB 42a in the sort unit of the walk environment.

Figure 23:
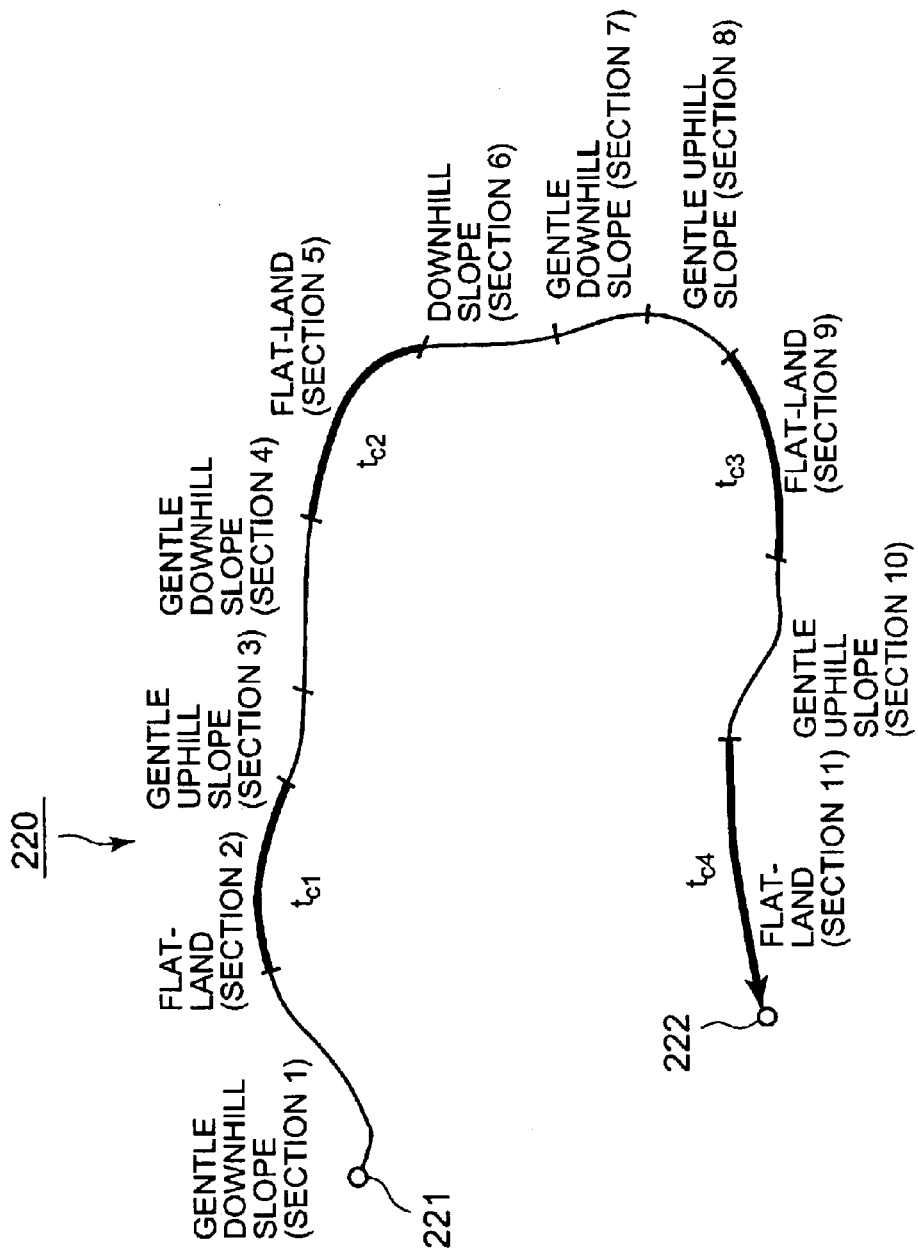
FIG. 23 is a diagram for illustratively showing a concrete example of a course segmental dividing process operation executed by the course designating process operation of FIG. 21.

FIG. 23 is a diagram for illustratively showing an example of a course 220 designated by the user who carries the navigation apparatus 4.

The designated course 220 shown in this drawing corresponds to a "⊃-shaped" route (path) having a starting point 221 and an end point 222. The walking environments of this course are given from the starting point 221 as follows: "gentle downhill slope", "flat land (level-land)", "gentle uphill slope", "gentle downhill slope", "flat-land", "downhill slope", - - -, "gentle uphill slope", and "flat land" ("flat-land" is expressed by wide line in FIG. 23). In the process operation of the step S203, the walking course is subdivided into a plurality of sections in the above-described walking environmental unit.

Next, the CPU 41 calculates both latitude and longitude of a dividing point of each of these plural sections based on the map information of the map information DB 42a (step S204), and selects a walking pattern of this section with reference to the walking pattern DB 51b (step S205). When this walking pattern is selected, while the walking pattern DB 51b is retrieved by employing as a key, a "walking environment item" of the walking pattern registered in the walking pattern DB 51b, the CPU 41 selects such a walking pattern which is made coincident with this walking environment as to each of the sections (see FIG. 4).

Next, the CPU 41 reads out a walking speed in each of these sections of this course from the walking pattern DB 51b (step S206). This reading operation of such a walking speed corresponds to a process operation in which the data about the walking pattern selected in the step S205 is read out form the walking pattern DB 51b, and then a walking speed set to a "walking speed item" of this read data is set to the walking speed of each of the sections.

Then, the CPU 41 calculates a distance of each of these sections from the map information set to the map information DB 42a, and also calculates walking time duration required for the respective sections by dividing this calculated distance by the walking speed read in the step S206 (step S207). Then, the CPU 41 calculates walking time duration "ta" required when the user walks along the entire course by summing these calculated required walking time duration of the respective sections (step S208).

Next, the CPU 41 compares the above-described required target time duration "tb" with the required time duration "ta" of the entire course (step S209) in order to judge as to whether or not there is a difference longer than, or equal to a preselected time between both these required time duration "tb" and "ta" (step S210). It should also be noted that this preselected time may be equal to the previously set value, or may be arbitrarily set by the user of the navigation apparatus 4.

In the case that the CPU 41 judges that there is no difference longer than, or equal to the preselected time in the step S210, the process operation is advanced to a further step S212. To the contrary, when the CPU 41 judges that there is no difference longer than, or equal to the preselected time in the step S210, the CPU 41 adjusts a walking speed in the flat-land section of the course by executing the below-mentioned "flat-land walking speed adjusting process operation" in such a manner that the required time duration "ta" of the entire course is made equal to the above-explained target required time duration "tb" (step S211). Then, the process operation is returned to the main routine. In this "flat-land walking speed adjusting process operation", the CPU 41 registers a new walking pattern into the walking pattern DB 51b, and also, registers course data into the walking course DB 51c.

On one hand, the CPU 41 judges that a difference between the required time duration "ta" of the entire course and the target required time duration "tb" is shorter than the above-described predetermined time (namely, "NO" in step S210), the CPU 41 forms such a walking course measurement data that starting points and end points of the respective sections of the course are employed as measuring points, and also, registers this formed walking course measurement data into the walking course DB 51c (step S212). Then, the process operation is returned to the main routine.

On the other hand, in the process operations defined in both the step S211 and the step S212, the walking pattern data, the date/time data, and the required time duration must be registered in the walking course measurement data. In this case, as to the date/time data, for example, while present date/time acquired from the timer 53 is assumed as the date/time data of the measuring point 1 (namely, starting point of course), date/time data of measuring points subsequent to this measuring point 1 may be calculated by sequentially multiplying the date/time data of the measuring point 1 by time duration required for each of the sections (required time duration obtained in step S208). That is, the required time for the respective sections are calculated:

date/time data of measuring point 1 - - - present date/time;
date/time data of measuring point 2 - - - present date/time+required time for section 1;
date/time data of measuring point 3 - - - present date/time+(required time for section 1+required time for section 2);
- - -
date/time data of measuring point "n" - - - present date/time+(required time for section 1+required time for section 2+required time for section 3+, - - - , +required time for section (n−1). It should be noted that the above-explained section (n−1) is assumed as a final section of a course.

Also, since the required time data of the walking course measurement data is such time duration required for the user who carries the navigation apparatus 4 and walks along the entire course, this required time data may be calculated by summing the respective required times for the respective sections (namely, section 1 to section (n−1)) of the course. Since this summing calculation is executed in the step S208, the calculated summation result is stored in the register group 43a of the RAM 43.

In the navigation apparatus 4 of this second embodiment, the walking patterns of the respective sections within the course are selected from the walking course DB 51c in the step S205, and thereafter, such a case may occur in the "flat-land walking speed adjusting process operation" of the step S211. That is, as to a flat-land section, the walking speed of this selected walking pattern must be adjusted. In such a case, as will be explained later, a walking pattern whose walking speed has been changed is registered as a new walking pattern into the walking pattern DB 51b. As a consequence, in a step S212, the above-explained walking pattern is registered as a walking pattern of the flat-land section into the walking course measurement data.

As previously explained, in the case that the user of the navigation apparatus 4 designates a course on the map and furthermore designates target time duration required for this course along which the user walks, this designated course is subdivided into two or more sections in response to a walking environment by utilizing the map information DB 42a and the GPS 49. In the example shown in FIG. 23, the course 220 is subdivided into 11 pieces of sections defined from a section 1 up to a section 11. Then, since a walking pattern in response to the walking environment of this section is retrieved/extracted from the walking pattern DB 51b, the walking pattern in this section is automatically selected. Then, the CPU 41 reads out walking speeds of these selected walking patterns from the walking pattern DB 51b, and calculates a required time duration (namely, time duration required for user who walks along course) in the case that the walking patterns are allocated to the respective sections in the above-described manner. When there is a difference between this calculated required time duration and the above-explained required target time duration, which is longer than, or equal to a preselected time, the CPU 41 adjusts the walking speeds of the walking patterns within the flat-land sections in order that the difference between the required time duration of this course and the required target time duration may be converged within the preselected time. In the example of FIG. 23, the required time duration for the flat-land sections 2, 5, 9, 11 correspond to "tc1", "tc2", "tc3", and "tc4", respectively. In this second embodiment, the CPU 41 adjusts a total required time duration "tc" (note that "tc"=tc1+tc2+tc3+tc4).

Then, the CPU 41 registers a walking pattern having the walking speed obtained by the above-described flat-land walking speed adjusting process operation into the walking pattern DB 51b, and forms walking course measurement data of the designated course, and then, registers this formed walking course measurement data into the walking course DB 51c. At this time, both the walking course name and the course outline may be set by the user of the navigation apparatus 4 by displaying such a registering screen 80 as shown in FIG. 10B on the display unit 45. Alternatively, both the walking course name and the course outline may be automatically registered. In this case, while information related to the designated course (namely, information related to name of region involving course and topographical information of this region) is acquired from the map information DB 42a, both the walking course name and the walking course outline may be formed based upon this acquired information.

Since the navigating process operation is carried out by employing the walking course measurement data which has been registered in the above-described walking course DB 51c in the above-explained manner, the navigation apparatus of this second embodiment can correctly issue such a notification of "walking speed is fast", or "walking speed is slow" in order that the user who carries this navigation apparatus may walk along the designated course within the designated required target time duration.

[Flat-Land Walking Speed Adjusting Process Operation]

Figure 22:
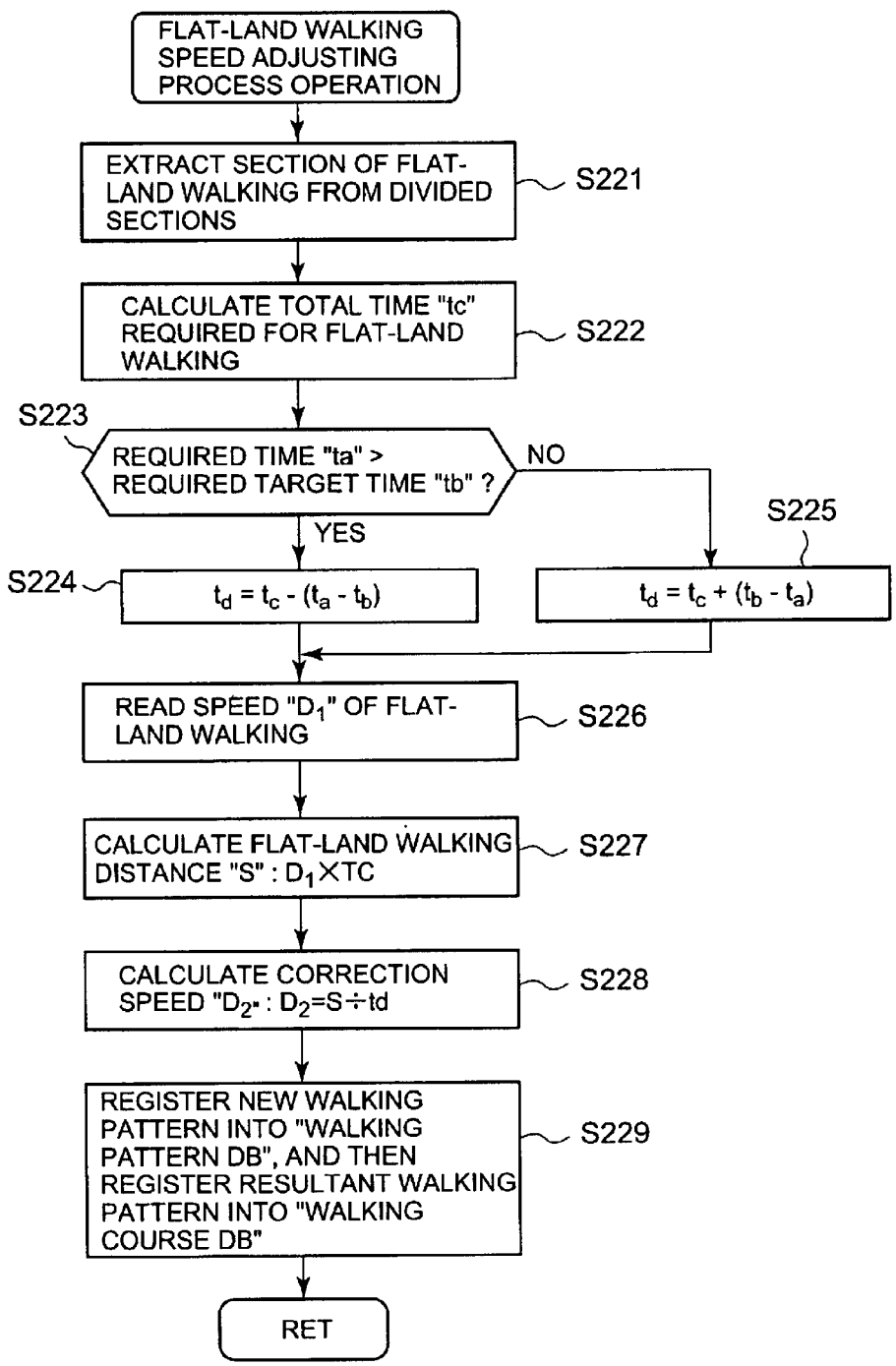
FIG. 22 is a flow chart for explaining a level-land walking speed adjusting process operation of FIG. 20.

FIG. 22 is a flow chart for explaining a detailed process operation as to the above-explained "flat-land walking speed adjusting process operation" defined in the step S211 of the flow chart indicated in FIG. 21.

In this processing operation, the CPU 41 firstly extracts a plurality of flat-land sections (namely, sections made of flat-lands along which user walks) from the sections obtained by dividing the course in the step S203 (step S221). Then, the CPU 41 calculates total required time duration "tc" in such a case that the user who carries the navigation apparatus 4 walks over these flat-land sections (step S222). Next, the CPU 41 judges as to whether or not the required time duration "ta" of the course>the required target time "tb" (step S223). When ta>tb, the CPU 41 calculates "tc−(ta−tb)", and then sets the calculation result as "td" (step S224). This time "td" is equal to a total walking time for the flat-land walking sections, which is required to reduce the required walking time duration for the course from the required target time duration "tb" shorter than a predetermined time.

On the other hand, when the required time duration "ta" is not longer than the required target time "tb" in the step S223, the CPU 41 calculates "tct (tb−ta)", and then sets this calculation result as "td" (step S225). This time "td" is also equal to a total walking time for the flat-land walking sections, which is required to reduce the required walking time duration of the course from the required target time duration "tb" shorter than a predetermined time.

Next, the CPU 41 reads out a flat-land walking speed "D1" of the user who carries the navigation apparatus 4 from the walking pattern DB 51b (step S226). The reading operation of this flat-land walking speed is carried out by reading out a "walking speed" of walking pattern data in which a walking environment is a "flat-land" from the walking pattern DB 51b.

Subsequently, the CPU 41 multiplies the flat-land walking speed "D1" by the total required time "tc" so as to obtain a flat-land walking distance "S" corresponding to this multiplication result (step S227). Furthermore, the CPU 41 divides the flat-land walking distance "S" by the time "td" so as to obtain a corrected speed "D2" corresponding to this division result (step S228). As explained above, this time "td" is equal to the adjust time of the flat-land walking sections, which is required to reduce the difference between the required time duration for the entire course (namely, required walking time) and the required target time shorter than the predetermined time. As a result, assuming now that the flat-land walking speed of the user of the navigation apparatus 4 is equal to the above-explained corrected speed "D2", the required time duration for the entire course can satisfy the required target time duration.

Next, the CPU 41 registers such a new walking pattern that a "walking environment" corresponds to a flat-land and a walking speed thereof is equal to "D2" into the walking pattern DB 51b, and further more sets this new walking pattern to the "walking pattern" item of the flat-land section of the "walking course measurement data" of the course, and also registers this walking course measurement data which has been set into the walking course DB 51c (step S229). Then, the process operation is returned to the main routine.

As previously explained, in the "flat-land walking speed adjusting process operation", the walking speeds of the flat-land sections within the course are adjusted in such a manner that the required time duration for the entire course may become equal to the required target time duration. Then, the CPU 41 registers the walking pattern under walking environment of the "flat-land" having this adjusted walking speed into the walking pattern DB 51b. Also, the CPU 41 forms the course data of this course, and then, stores the formed course data into the walking course DB 51c.

[Modifications]

It should also be understood that although the section where the walking speed is adjusted is limited only to the flat-land section in the above embodiments, the present invention is not limited thereto. Alternatively, walking speeds of other walking environments such as a downhill slope and an uphill slope may be adjusted in order that the required time duration for the entire course may be made equal to the required target time duration, or the difference between these required time duration may be made shorter than the predetermined time duration.

In the above-explained embodiment modes, the positional information is detected by using the GPS. Alternatively, the positional information may be acquired by operating a PHS, a portable telephone, and the like. Also, in the above-described embodiment modes, a walking speed of a section within the course is calculated based upon a measurement time by the timer 53 and a distance between a starting position and an end position of this section. Alternatively, a walking speed may be calculated by utilizing either the acceleration sensor 50 or a speed sensor. Also, the navigation apparatus according to the present invention may be realized as not only a single electronic appliance, but also such a device assembled into a portable telephone and a portable information terminal, or as a software product. Also, the software process operation according to the present invention may be realized by executing the programs installed in the main body of this navigation apparatus, and also by downloading application software such as a Java program via a network into these portable electronic appliances. The navigation apparatus of the present invention is not limited to a walking, but may be applied to, for example, runnings such as jogging and marathon.

As previously described in detail, in accordance with the navigation method/apparatus and the navigation program of the present invention, the positional information, the time instant information, and the walking patterns are registered with respect to a plurality of sections subdivided within the course, and the course data into which the correct required time duration for the course have been registered can be formed.

Also, while the user walks along such a course where this user walked in the past, the navigation apparatus of the present invention continuously monitors as to whether or not the user deviates from this course. When this user deviates from the course, the navigation apparatus may notify this course deviation to the user and also may provide the route for returning back to the correct course. As a consequence, the user can recognize that the user himself walks along the correct course, and can immediately return to the correct course, if required.

Also, while the user walks along such a course where this user walked in the past, the navigation apparatus continuously monitors as to whether or not the user walks along this course at the same pace as that defined when the walking pace is registered. When the present walking pace is different from the registered walking pace, the navigation apparatus notifies this different walking pace. As a result, the user can confirm as to whether or not the own walking pace is proper, and also can adjust the walking speed in such a manner that the present walking pace may become equal to the walking pace defined when the walking pace is registered.

Also, when the course is designated, the CPU subdivides this course into either one or a plurality of sections in response to the walking environment based upon the map information of this designated course, calculates the walking time duration required for the respective sections from the registered information of the user. Then, the CPU predicts the walking time duration required for the entire course based on these calculated walking time duration, and thus, can automatically form/register the detailed course data into which both the information acquired every section and the walking time duration required for the entire course have been set.

Also, if the target time duration required for the course is set when the above-described course is set, the CPU calculates the walking speeds of the respective sections within the designated course based upon the registered information of the user in such a manner that the walking time duration required for the entire course may become equal to the above-explained target time, or the difference between this required walking time duration and the target time duration may be converged within-a preselected time range. Thus, the CPU can automatically form/register such a course data in which the calculated walking speeds of the respective sections of this course have been adjusted.

What is claimed is:

1. A navigation apparatus comprising:
    positional information acquiring means for acquiring positional information of a portable terminal apparatus;
    acceleration detecting means for detecting acceleration produced in connection with movement of said portable terminal apparatus;
    walking pattern acquiring means for acquiring a walking pattern of a user from acceleration data detected by said acceleration detecting means;
    temporal information acquiring means for acquiring temporal information;
    course data storage means for storing thereinto as course data the positional information of the portable terminal apparatus, the walking pattern of said user, and a present time instant;
    walking pace monitoring means for reading said course data from the course data storage means when the user walks along a course whose data has been stored in said course data storage means, and for monitoring both a present walking pace of the user and a past walking pace of said user when said user walked along said course in the past based upon the temporal information which is contained in said read course data; and
    providing means for providing a message related to the present walking pace to said user in response to a monitoring result of said walking pace monitoring means.

2. The navigation apparatus as claimed in claim 1 wherein said walking pattern acquiring means comprises:
    peak point extracting means for extracting a plurality of peak points from the acceleration data outputted by said acceleration detecting means;
    peak interval calculating means for calculating a peak interval based upon a time period between said plural peak points extracted by said peak point extracting means; and
    peak acceleration calculating means for calculating peak acceleration based upon an amplitude between said plural peak points extracted by said peak point extracting means.

3. The navigation apparatus as claimed in claim 1 wherein said walking pattern acquiring means comprises:
    peak point extracting means for extracting a plurality of peak points from the acceleration data outputted by said acceleration detecting means;
    peak interval calculating means for calculating a peak interval based upon an average value of time periods between said plural peak points extracted by said peak point extracting means; and
    peak acceleration calculating means for calculating peak acceleration based upon an average value of amplitudes between said plural peak points extracted by said peak point extracting means.

4. The navigation apparatus as claimed in claim 1 wherein said walking pace monitoring means comprises:
    walking time comparing means for comparing a walking time defined up to a present position, which has been acquired by said temporal information acquiring means, with a walking time defined up to the present position, which has been stored in said course data storage means.

5. A navigation apparatus comprising:
    positional information acquiring means for acquiring positional information of a portable terminal apparatus;
    acceleration detecting means for detecting acceleration produced in connection with movement of said portable terminal apparatus;
    course data forming means for forming course data about a course along which a user walks based upon both the positional information detected by said positional information detecting means and said acceleration detected by said acceleration detecting means;
    course data storage means for storing thereinto the course data formed by said course data forming means;
    past-walking-position-trail-data forming means for forming past-walking-position-trail data when the user walked along said course in the past based upon the course data stored in said course data storage means;
    present-walking-position-trail-data forming means for forming present-walking-position-trail data when the user walks along said course at a present time based upon said course data formed by said course data forming means;

walking trail monitoring means for identifying said present-walking-position-trail data formed by said present-walking-position-trail-data forming means with respect to said past-walking-position-trail data formed by said past-walking-position-trail-data forming means in order to monitor as to whether said user deviates from a past walking trail; and providing means for providing a message that said user deviates from said course with respect to the user when said walking trail monitoring means judges that said user deviates from said past walking trail, and for providing a route for returning back to said course with respect to said user.

6. The navigation apparatus as claimed in claim 5 wherein:

said past-walking-position-trail-data forming means graphically represents a relationship between latitude and longitude based upon the course data about the course along which the user walked in the past, stored in said course data storage means;

said present-walking-trail-data forming means graphically represents a relationship between latitude and longitude based upon the course data about the course along which the user walks at the present time, formed by said course data forming means; and said walking trail monitoring means executes a matching process operation as to said latitude/longitude relationship graphically formed by said past-walking-position-trail-data forming means with respect to said latitude/longitude relationship graphically formed by said present-walking-position-trail-data forming means.

7. A navigation apparatus comprising:

comparing means for comparing a target time required for a user of said navigation apparatus to walk along a course with a past time required by said user to walk along said course in the past; and adjusting means for notifying the user to adjust his/her walking speed in said course such that said target time of the user is made coincident with the past time required by the user when said comparing means judges that there is a difference between said target time and said past time required by the user.

8. The navigation apparatus as claimed in claim 7, further comprising:

previously-stored map information; and a walking pattern database into which walking speeds of the user under respective walking environments have been registered as walking patterns;

wherein said comparing means comprises:

dividing means for dividing a designated course into a plurality of sections corresponding to walking environments based upon said previously-stored map information;

extracting means for extracting the walking speeds of the user in respective sections of said designated course obtained from said dividing means, from said walking pattern database;

first calculating means for calculating distances of said respective sections based upon said map information, and for calculating a time required for said user to move over the respective sections based upon the distances of the respective sections and the walking speeds of the user for the respective sections extracted by said extracting means; and second calculating means for summing said times required for the respective sections calculated by said first calculating means so as to calculate a time required for said user to move over said designated course;

wherein said comparing means compares said time calculated by said second calculating means with said target time.

9. The navigation apparatus as claimed in claim 7, further comprising:

previously-stored map information; and a walking pattern database into which walking speeds of the user under respective walking environments have been registered as walking patterns;

wherein said adjusting means comprises:

dividing means for dividing a designated course into a plurality of sections corresponding to the walking environments based upon said previously-stored map information;

first calculating means for extracting the walking speeds of the user in respective sections of said designated course obtained from said dividing means, from said walking pattern database, for calculating distances of said respective sections based upon said map information, and for calculating a time required for said user to move over the respective sections based upon the distances of the respective sections and the extracted walking speeds of the user for the respective sections;

second calculating means for calculating a difference time between a total value of the required times for the respective sections, calculated by said first calculating means, and said target time; and third calculating means for calculating a total value of the required times under the same walking environment from the time required for the user to move over the respective sections calculated by said first calculating means;

wherein said adjusting means adjusts the walking speed of the user for said designated course based upon the calculated results of said first calculating means, said second calculating means, and said third calculating means such that said target time of said user is made coincident with said past time required by the user.

10. A navigation method comprising:

acquiring positional information of a portable terminal apparatus;

detecting acceleration produced in connection with movement of said portable terminal apparatus;

acquiring a walking pattern of a user from detected acceleration data;

acquiring temporal information;

storing as course data the positional information of the portable terminal apparatus, the walking pattern of said user, and a present time instant;

reading said stored course data when the user walks along a course whose data has been stored, and then monitoring both a present walking pace of the user and a past walking pace of the user when said user walked along said course in the past based upon the temporal information which is contained in said read course data; and providing a message related to the present walking pace to said user in response to a monitoring result of said walking pace monitoring step.

11. A navigation method comprising:

acquiring positional information of a portable terminal apparatus;

detecting acceleration produced in connection with movement of said portable terminal apparatus;

forming course data about a course along which said user walks based upon both the acquired positional information and said detected acceleration;

storing the formed course data;

forming past-walking-position-trail data when the user walked along said course in the past based upon the stored course data;

forming present-walking-position-trail data when the user walks along said course at a present time based upon said formed course data;

identifying said present-walking-position-trail data with respect to said past-walking-position-trail data in order to monitor whether said user deviates from a past walking trail; and providing a message that said user deviates from said course with respect to the user when it is judged that said user deviates from said past walking trail, and then providing a route for returning back to said course with respect to said user.

12. A navigation method comprising:

comparing a target time required for a user to walk along a course with a past time required by said user to walk along said course in the past; and notifying the user to adjust his/her walking speed in said course such that said target time of the user is made coincident with the past time required by the user when it is judged that there is a difference between said target time and said past time required by the user.

13. A navigation program executable by a computer installed in a navigation apparatus wherein said navigation program causes said computer to execute:

a positional information acquiring function for acquiring positional information of a portable terminal apparatus;

an acceleration detecting function for detecting acceleration produced in connection with movement of said portable terminal apparatus;

a walking pattern acquiring function for acquiring a walking pattern of a user from acceleration data detected by said acceleration detecting function;

a temporal information acquiring function for acquiring temporal information;

a course data storage function for storing thereinto as course data the positional information of the portable terminal apparatus, the walking pattern of said user, and a present time instant;

a walking pace monitoring function for reading said course data from the course data storage function when the user walks along a course whose data has been stored in said course data storage function, and then for monitoring both a present walking pace of the user and a past walking pace of the user when said user walked along said course in the past based upon the temporal information which is contained in said read course data; and a notification function for providing a message related to the present walking pace to said user in response to a monitoring result of said walking pace monitoring function.

14. A navigation program executable by a computer installed in a navigation apparatus wherein said navigation program causes said computer to execute:

a positional information acquiring function for acquiring positional information of a portable terminal apparatus;

an acceleration detecting function for detecting acceleration produced in connection with movement of said portable terminal apparatus;

a course data forming function for forming course data about a course along which a user walks based upon both the acquired positional information and said detected acceleration;

a course data storing function for storing the formed course data;

a past-walking-position-trail-data forming function for forming past-walking-position-trail data when the user walked along said course in the past based upon the stored course data;

a present-walking-position-trail-data forming function for forming present-waling-position-trail data when the user walks along said course at a present time based upon said formed course data;

a walking trail monitoring function for identifying said present-walking-position-trail data with respect to said past-walking-position-trail data in order to monitor whether said user deviates from a past walking trail; and a notification function for providing a message that said user deviates from said course with respect to the user when it is judged that said user deviates from said past walking trail, and then for providing a route for returning back to said course with respect to said user.

15. A navigation program executable by a computer installed in a navigation apparatus wherein said navigation program causes said computer to execute:

a comparing function for comparing a target time required for a user to walk along a course with a past time required by said user to walk along said course in the past; and an adjusting function for notifying the user to adjust his/her walking speed in said course such that said target time of the user is made coincident with the past time required by the user when it is judged that there is a difference between said target time of the user and said past time required by the user.

* * * * *